United States Patent
Kim et al.

(10) Patent No.: US 10,924,747 B2
(45) Date of Patent: Feb. 16, 2021

(54) VIDEO CODING TECHNIQUES FOR MULTI-VIEW VIDEO

(71) Applicant: Apple Inc., Cupertino, CA (US)

(72) Inventors: Jae Hoon Kim, San Jose, CA (US);
Chris Y. Chung, Sunnyvale, CA (US);
Dazhong Zhang, Milpitas, CA (US);
Hang Yuan, San Jose, CA (US);
Hsi-Jung Wu, San Jose, CA (US);
Jiefu Zhai, San Jose, CA (US);
Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 15/443,342

(22) Filed: Feb. 27, 2017

(65) Prior Publication Data

US 2018/0249164 A1    Aug. 30, 2018

(51) Int. Cl.
*H04B 1/66*        (2006.01)
*H04N 19/176*      (2014.01)
(Continued)

(52) U.S. Cl.
CPC ......... *H04N 19/176* (2014.11); *H04N 19/105* (2014.11); *H04N 19/112* (2014.11);
(Continued)

(58) Field of Classification Search
CPC ............. H04N 5/23238; H04N 21/816; H04N 13/332; H04N 19/597; H04N 13/139; H04N 13/161; H04N 13/243; H04N 13/286

(Continued)

(56) References Cited

U.S. PATENT DOCUMENTS 4,890,257 A    12/1989  Anthias et al.
5,185,667 A     2/1993  Zimmerman
(Continued)

FOREIGN PATENT DOCUMENTS

EP    2077525 A1    7/2009
JP    2008-193458 A    8/2008
(Continued)

OTHER PUBLICATIONS

AHG8: InterDigital's projection format conversion tool Joint Video Exploration Team (JVET) of ITU-T SG 16 WP 3 and ISO/IEC JTC 1/SC 29/WG 11 4th Meeting: Chengdu, CN, Oct. 15-21, 2016.*
(Continued)

*Primary Examiner* — Masum Billah
(74) *Attorney, Agent, or Firm* — BakerHostetler

(57) ABSTRACT

Techniques are disclosed for coding and decoding video captured as cube map images. According to these techniques, padded reference images are generated for use during predicting input data. A reference image is stored in a cube map format. A padded reference image is generated from the reference image in which image data of a first view contained in reference image is replicated and placed adjacent to a second view contained in the cube map image. When coding a pixel block of an input image, a prediction search may be performed between the input pixel block and content of the padded reference image. When the prediction search identifies a match, the pixel block may be coded with respect to matching data from the padded reference image. Presence of replicated data in the padded reference image is expected to increase the likelihood that adequate prediction matches will be identified for input pixel block data, which will increase overall efficiency of the video coding.

26 Claims, 12 Drawing Sheets

(51) Int. Cl.
    *H04N 19/105* (2014.01)
    *H04N 19/112* (2014.01)
    *H04N 19/174* (2014.01)
    *H04N 19/593* (2014.01)
    *H04N 19/597* (2014.01)

(52) U.S. Cl.
    CPC ......... *H04N 19/174* (2014.11); *H04N 19/593* (2014.11); *H04N 19/597* (2014.11)

(58) Field of Classification Search
    USPC .......................................................... 375/240
    See application file for complete search history.

(56) References Cited

U.S. PATENT DOCUMENTS

| | | |
|---|---|---|
| 5,262,777 A | 11/1993 | Low et al. |
| 5,313,306 A | 5/1994 | Kuban et al. |
| 5,359,363 A | 10/1994 | Kuban et al. |
| 5,448,687 A | 9/1995 | Hoogerhyde et al. |
| 5,537,155 A | 7/1996 | O'Connell et al. |
| 5,600,346 A | 2/1997 | Kamata et al. |
| 5,684,937 A | 11/1997 | Oxaal |
| 5,689,800 A | 11/1997 | Downs |
| 5,715,016 A | 2/1998 | Kobayashi et al. |
| 5,787,207 A | 7/1998 | Golin |
| 5,872,604 A | 2/1999 | Ogura |
| 5,903,270 A | 5/1999 | Gentry et al. |
| 5,936,630 A | 8/1999 | Oxaal |
| 6,011,897 A | 1/2000 | Koyama et al. |
| 6,031,540 A | 2/2000 | Golin et al. |
| 6,043,837 A | 3/2000 | Driscoll, Jr. et al. |
| 6,058,212 A | 5/2000 | Yokoyama |
| 6,122,317 A | 9/2000 | Hanami et al. |
| 6,144,890 A | 11/2000 | Rothkop |
| 6,204,854 B1 | 3/2001 | Signes et al. |
| 6,219,089 B1 | 4/2001 | Driscoll, Jr. et al. |
| 6,222,883 B1 | 4/2001 | Murdock et al. |
| 6,317,159 B1 | 11/2001 | Aoyama |
| 6,331,869 B1 | 12/2001 | Furlan et al. |
| 6,426,774 B1 | 7/2002 | Driscoll, Jr. et al. |
| 6,535,643 B1 | 3/2003 | Hong |
| 6,539,060 B1 | 3/2003 | Lee et al. |
| 6,559,853 B1 | 5/2003 | Hashimoto et al. |
| 6,577,335 B2 | 6/2003 | Kobayashi et al. |
| 6,751,347 B2 | 6/2004 | Pettigrew et al. |
| 6,762,789 B1 | 7/2004 | Sogabe et al. |
| 6,769,131 B1 | 7/2004 | Tanaka et al. |
| 6,795,113 B1 | 9/2004 | Jackson et al. |
| 6,907,310 B2 | 6/2005 | Gardner et al. |
| 6,973,130 B1 | 12/2005 | Wee et al. |
| 6,993,201 B1 | 1/2006 | Haskell et al. |
| 7,006,707 B2 | 2/2006 | Peterson |
| 7,015,954 B1 | 3/2006 | Foote et al. |
| 7,039,113 B2 | 5/2006 | Soundararajan |
| 7,050,085 B1 | 5/2006 | Park et al. |
| 7,095,905 B1 | 8/2006 | Peterson |
| 7,123,777 B2 | 10/2006 | Rondinelli et al. |
| 7,139,440 B2 | 11/2006 | Rondinelli et al. |
| 7,149,549 B1 | 12/2006 | Ortiz et al. |
| 7,259,760 B1 | 8/2007 | Hashimoto et al. |
| 7,327,787 B1 | 2/2008 | Chen et al. |
| 7,382,399 B1 | 6/2008 | McCall et al. |
| 7,385,995 B2 | 6/2008 | Stiscia et al. |
| 7,415,356 B1 | 8/2008 | Gowda et al. |
| 7,433,535 B2 | 10/2008 | Mukherjee et al. |
| 7,450,749 B2 | 11/2008 | Rouet et al. |
| 7,593,041 B2 | 9/2009 | Novak et al. |
| 7,620,261 B2 | 11/2009 | Chiang et al. |
| 7,660,245 B1 | 2/2010 | Luby |
| 7,742,073 B1 | 6/2010 | Cohen-Solal et al. |
| 7,755,667 B2 | 7/2010 | Rabbani et al. |
| 7,782,357 B2 | 8/2010 | Cutler |
| 8,027,473 B2 | 9/2011 | Stiscia et al. |
| 8,045,615 B2 | 10/2011 | Liang et al. |
| 8,217,956 B1 | 7/2012 | Jin |
| 8,255,552 B2 | 8/2012 | Witt et al. |
| 8,270,496 B2 | 9/2012 | Yin et al. |
| 8,295,360 B1 | 10/2012 | Lewis et al. |
| 8,339,394 B1 | 12/2012 | Lininger |
| 8,442,109 B2 | 5/2013 | Wang et al. |
| 8,442,311 B1 | 5/2013 | Hobbs et al. |
| 8,462,109 B2 | 6/2013 | Nasiri et al. |
| 8,462,853 B2 | 6/2013 | Jeon et al. |
| 8,482,595 B2 | 7/2013 | Kweon |
| 8,682,091 B2 | 3/2014 | Amit et al. |
| 8,693,537 B2 | 4/2014 | Wang et al. |
| 8,711,941 B2 | 4/2014 | Letunovskiy et al. |
| 9,013,536 B2 | 4/2015 | Zhu et al. |
| 9,071,484 B1 | 6/2015 | Traux |
| 9,094,681 B1 | 7/2015 | Wilkins et al. |
| 9,098,870 B2 | 8/2015 | Meadow et al. |
| 9,219,919 B2 | 12/2015 | Deshpande |
| 9,224,247 B2 | 12/2015 | Wada et al. |
| 9,258,520 B2 | 2/2016 | Lee |
| 9,277,122 B1 | 3/2016 | Imura et al. |
| 9,404,764 B2 | 8/2016 | Lynch |
| 9,430,873 B2 | 8/2016 | Nakamura et al. |
| 9,510,007 B2 | 11/2016 | Chan et al. |
| 9,516,225 B2 | 12/2016 | Banta et al. |
| 9,596,899 B2 | 3/2017 | Stahl et al. |
| 9,639,935 B1 | 5/2017 | Douady-Pleven et al. |
| 9,723,223 B1 | 8/2017 | Banta et al. |
| 9,743,060 B1 | 8/2017 | Matias et al. |
| 9,754,413 B1 | 9/2017 | Gray |
| 9,781,356 B1 | 10/2017 | Banta et al. |
| 9,823,835 B2 | 11/2017 | Wang et al. |
| 9,838,687 B1 | 12/2017 | Banta et al. |
| 9,866,815 B2 | 1/2018 | Vrcelj et al. |
| 9,936,204 B1 | 4/2018 | Sim et al. |
| 9,967,563 B2 | 5/2018 | Hsu et al. |
| 9,967,577 B2 | 5/2018 | Wu et al. |
| 9,992,502 B2 | 6/2018 | Abbas et al. |
| 9,996,945 B1 | 6/2018 | Holzer et al. |
| 10,102,611 B1 | 10/2018 | Murtha et al. |
| 10,204,658 B2 | 2/2019 | Krishnan |
| 10,212,456 B2 | 2/2019 | Guo et al. |
| 10,277,897 B1 | 4/2019 | Mukherjee et al. |
| 10,282,814 B2 | 5/2019 | Lin et al. |
| 10,306,186 B2 | 5/2019 | Chuang et al. |
| 10,321,109 B1 | 6/2019 | Tanumihardja et al. |
| 10,334,222 B2 | 6/2019 | Kokare et al. |
| 10,339,627 B2 | 7/2019 | Abbas et al. |
| 10,339,688 B2 | 7/2019 | Su et al. |
| 10,349,068 B1 | 7/2019 | Banta et al. |
| 10,375,371 B2 | 8/2019 | Xu et al. |
| 10,455,238 B2 | 10/2019 | Mody et al. |
| 10,523,913 B2 | 12/2019 | Kim et al. |
| 10,559,121 B1 | 2/2020 | Moudgil et al. |
| 10,573,060 B1 | 2/2020 | Ascolese et al. |
| 10,574,997 B2 | 2/2020 | Chung et al. |
| 10,642,041 B2 | 5/2020 | Han et al. |
| 10,652,284 B2 | 5/2020 | Liu et al. |
| 10,728,546 B2 | 7/2020 | Leontaris et al. |
| 2001/0006376 A1 | 7/2001 | Numa et al. |
| 2001/0028735 A1 | 10/2001 | Pettigrew et al. |
| 2001/0036303 A1 | 11/2001 | Maurincomme et al. |
| 2002/0080878 A1 | 6/2002 | Li |
| 2002/0093670 A1 | 7/2002 | Luo et al. |
| 2002/0126129 A1 | 9/2002 | Snyder et al. |
| 2002/0140702 A1 | 10/2002 | Koller et al. |
| 2002/0141498 A1 | 10/2002 | Martins |
| 2002/0190980 A1 | 12/2002 | Gerritsen et al. |
| 2002/0196330 A1 | 12/2002 | Park et al. |
| 2003/0098868 A1 | 5/2003 | Fujiwara et al. |
| 2003/0099294 A1 | 5/2003 | Wang et al. |
| 2003/0152146 A1 | 8/2003 | Lin et al. |
| 2004/0022322 A1 | 2/2004 | Dye |
| 2004/0028133 A1 | 2/2004 | Subramaniyan et al. |
| 2004/0028134 A1 | 2/2004 | Subramaniyan et al. |
| 2004/0032906 A1 | 2/2004 | Lillig et al. |
| 2004/0056900 A1 | 3/2004 | Blume |
| 2004/0189675 A1 | 9/2004 | Pretlove et al. |
| 2004/0201608 A1 | 10/2004 | Ma et al. |

(56) References Cited

U.S. PATENT DOCUMENTS

| | | |
|---|---|---|
| 2004/0218099 A1 | 11/2004 | Washington |
| 2004/0227766 A1 | 11/2004 | Chou et al. |
| 2004/0247173 A1 | 12/2004 | Nielsen et al. |
| 2005/0013498 A1 | 1/2005 | Srinivasan et al. |
| 2005/0041023 A1 | 2/2005 | Green |
| 2005/0069682 A1 | 3/2005 | Tseng |
| 2005/0129124 A1 | 6/2005 | Ha |
| 2005/0204113 A1 | 9/2005 | Harper et al. |
| 2005/0243915 A1 | 11/2005 | Kwon et al. |
| 2005/0244063 A1 | 11/2005 | Kwon et al. |
| 2006/0034527 A1 | 2/2006 | Gritsevich |
| 2006/0055699 A1 | 3/2006 | Perlman et al. |
| 2006/0055706 A1 | 3/2006 | Perlman et al. |
| 2006/0110062 A1 | 5/2006 | Chiang et al. |
| 2006/0119599 A1 | 6/2006 | Woodbury |
| 2006/0126719 A1 | 6/2006 | Wilensky |
| 2006/0132482 A1 | 6/2006 | Oh |
| 2006/0165164 A1 | 7/2006 | Kwan et al. |
| 2006/0165181 A1 | 7/2006 | Kwan et al. |
| 2006/0204043 A1 | 9/2006 | Takei |
| 2006/0238445 A1 | 10/2006 | Wang et al. |
| 2006/0282855 A1 | 12/2006 | Margulis |
| 2007/0024705 A1 | 2/2007 | Richter et al. |
| 2007/0057943 A1 | 3/2007 | Beda et al. |
| 2007/0064120 A1 | 3/2007 | Didow et al. |
| 2007/0071100 A1 | 3/2007 | Shi et al. |
| 2007/0097268 A1 | 5/2007 | Relan et al. |
| 2007/0115841 A1 | 5/2007 | Taubman et al. |
| 2007/0223582 A1 | 9/2007 | Borer |
| 2007/0263722 A1 | 11/2007 | Fukuzawa |
| 2007/0291143 A1 | 12/2007 | Barbieri et al. |
| 2008/0036875 A1 | 2/2008 | Jones et al. |
| 2008/0044104 A1 | 2/2008 | Gering |
| 2008/0049991 A1 | 2/2008 | Gering |
| 2008/0077953 A1 | 3/2008 | Fernandez et al. |
| 2008/0118180 A1 | 5/2008 | Kamiya et al. |
| 2008/0184128 A1 | 7/2008 | Swenson et al. |
| 2008/0252717 A1 | 10/2008 | Moon et al. |
| 2008/0310513 A1 | 12/2008 | Ma et al. |
| 2009/0040224 A1 | 2/2009 | Igarashi et al. |
| 2009/0123088 A1 | 5/2009 | Kallay et al. |
| 2009/0153577 A1 | 6/2009 | Ghyme et al. |
| 2009/0190858 A1 | 7/2009 | Moody et al. |
| 2009/0219280 A1 | 9/2009 | Maillot |
| 2009/0219281 A1 | 9/2009 | Maillot |
| 2009/0251530 A1 | 10/2009 | Cilia et al. |
| 2009/0262838 A1 | 10/2009 | Gholmieh et al. |
| 2010/0029339 A1 | 2/2010 | Kim et al. |
| 2010/0061451 A1 | 3/2010 | Fuchigami |
| 2010/0079605 A1 | 4/2010 | Wang et al. |
| 2010/0080287 A1 | 4/2010 | Ali |
| 2010/0110481 A1 | 5/2010 | Do et al. |
| 2010/0124274 A1 | 5/2010 | Cheok et al. |
| 2010/0135389 A1 | 6/2010 | Tanizawa et al. |
| 2010/0215226 A1 | 8/2010 | Kaufman et al. |
| 2010/0305909 A1 | 12/2010 | Wolper et al. |
| 2010/0316129 A1 | 12/2010 | Zhao et al. |
| 2010/0329361 A1 | 12/2010 | Choi et al. |
| 2010/0329362 A1 | 12/2010 | Choi et al. |
| 2011/0058055 A1 | 3/2011 | Lindahl et al. |
| 2011/0090967 A1 | 4/2011 | Chen et al. |
| 2011/0128350 A1 | 6/2011 | Oliver et al. |
| 2011/0142306 A1 | 6/2011 | Nair |
| 2011/0194617 A1 | 8/2011 | Kumar et al. |
| 2011/0200100 A1 | 8/2011 | Kim et al. |
| 2011/0235706 A1 | 9/2011 | Demircin et al. |
| 2011/0274158 A1 | 11/2011 | Fu et al. |
| 2011/0305274 A1 | 12/2011 | Fu et al. |
| 2011/0310089 A1 | 12/2011 | Petersen |
| 2012/0082232 A1 | 4/2012 | Rojals et al. |
| 2012/0098926 A1 | 4/2012 | Kweon |
| 2012/0192115 A1 | 7/2012 | Falchuk et al. |
| 2012/0219055 A1 | 8/2012 | He et al. |
| 2012/0230392 A1 | 9/2012 | Zheng et al. |
| 2012/0260217 A1 | 10/2012 | Celebisoy |
| 2012/0263231 A1 | 10/2012 | Zhou |
| 2012/0307746 A1 | 12/2012 | Hammerschmidt et al. |
| 2012/0320169 A1 | 12/2012 | Bathiche |
| 2012/0320984 A1 | 12/2012 | Zhou |
| 2012/0327172 A1 | 12/2012 | El-Saban et al. |
| 2013/0003858 A1 | 1/2013 | Sze |
| 2013/0016783 A1 | 1/2013 | Kim et al. |
| 2013/0044108 A1 | 2/2013 | Tanaka et al. |
| 2013/0051452 A1 | 2/2013 | Li et al. |
| 2013/0051467 A1 | 2/2013 | Zhou et al. |
| 2013/0088491 A1 | 4/2013 | Hobbs et al. |
| 2013/0094568 A1 | 4/2013 | Hsu et al. |
| 2013/0101025 A1 | 4/2013 | Van der Auwera et al. |
| 2013/0101042 A1 | 4/2013 | Sugio et al. |
| 2013/0111399 A1 | 5/2013 | Rose |
| 2013/0124156 A1 | 5/2013 | Wolper et al. |
| 2013/0127844 A1 | 5/2013 | Koeppel et al. |
| 2013/0128986 A1 | 5/2013 | Tsai et al. |
| 2013/0136174 A1 | 5/2013 | Xu et al. |
| 2013/0170726 A1 | 7/2013 | Kaufman et al. |
| 2013/0182775 A1 | 7/2013 | Wang et al. |
| 2013/0195183 A1 | 8/2013 | Zhai et al. |
| 2013/0208787 A1 | 8/2013 | Zheng et al. |
| 2013/0219012 A1 | 8/2013 | Suresh et al. |
| 2013/0251028 A1 | 9/2013 | Au et al. |
| 2013/0272415 A1 | 10/2013 | Zhou |
| 2013/0301706 A1 | 11/2013 | Qiu et al. |
| 2014/0002439 A1 | 1/2014 | Lynch |
| 2014/0003450 A1 | 1/2014 | Bentley et al. |
| 2014/0010293 A1 | 1/2014 | Srinivasan et al. |
| 2014/0078263 A1 | 3/2014 | Kim |
| 2014/0082054 A1 | 3/2014 | Denoual et al. |
| 2014/0089326 A1 | 3/2014 | Lin et al. |
| 2014/0140401 A1 | 5/2014 | Lee et al. |
| 2014/0153636 A1 | 6/2014 | Esenlik et al. |
| 2014/0169469 A1 | 6/2014 | Bernal et al. |
| 2014/0176542 A1 | 6/2014 | Shohara et al. |
| 2014/0218356 A1 | 8/2014 | Distler et al. |
| 2014/0254949 A1 | 9/2014 | Chou |
| 2014/0267235 A1 | 9/2014 | DeJohn et al. |
| 2014/0269899 A1 | 9/2014 | Park et al. |
| 2014/0286410 A1 | 9/2014 | Zenkich |
| 2014/0355667 A1 | 12/2014 | Lei et al. |
| 2014/0368669 A1 | 12/2014 | Talvala et al. |
| 2014/0376634 A1 | 12/2014 | Guo et al. |
| 2015/0003525 A1 | 1/2015 | Sasai et al. |
| 2015/0003725 A1 | 1/2015 | Wan |
| 2015/0016522 A1 | 1/2015 | Sato |
| 2015/0029294 A1 | 1/2015 | Lin et al. |
| 2015/0062292 A1 | 3/2015 | Kweon |
| 2015/0089348 A1 | 3/2015 | Jose |
| 2015/0103884 A1 | 4/2015 | Ramasubramonian et al. |
| 2015/0145966 A1 | 5/2015 | Krieger et al. |
| 2015/0195491 A1 | 7/2015 | Shaburov et al. |
| 2015/0195559 A1 | 7/2015 | Chen et al. |
| 2015/0215631 A1 | 7/2015 | Zhou et al. |
| 2015/0237370 A1 | 8/2015 | Zhou et al. |
| 2015/0256839 A1 | 9/2015 | Ueki et al. |
| 2015/0264259 A1 | 9/2015 | Raghoebardajal et al. |
| 2015/0264386 A1 | 9/2015 | Pang et al. |
| 2015/0264404 A1 | 9/2015 | Hannuksela |
| 2015/0271517 A1 | 9/2015 | Pang et al. |
| 2015/0279087 A1 | 10/2015 | Myers et al. |
| 2015/0279121 A1 | 10/2015 | Myers et al. |
| 2015/0304665 A1 | 10/2015 | Hannuksela et al. |
| 2015/0321103 A1 | 11/2015 | Barnett et al. |
| 2015/0326865 A1 | 11/2015 | Yin et al. |
| 2015/0339853 A1 | 11/2015 | Wolper et al. |
| 2015/0341552 A1 | 11/2015 | Chen et al. |
| 2015/0346812 A1 | 12/2015 | Cole et al. |
| 2015/0346832 A1 | 12/2015 | Cole et al. |
| 2015/0350673 A1 | 12/2015 | Hu et al. |
| 2015/0351477 A1 | 12/2015 | Stahl et al. |
| 2015/0358612 A1 | 12/2015 | Sandrew et al. |
| 2015/0358613 A1 | 12/2015 | Sandrew et al. |
| 2015/0358633 A1 | 12/2015 | Choi et al. |
| 2015/0373334 A1 | 12/2015 | Rapaka et al. |
| 2015/0373372 A1 | 12/2015 | He et al. |
| 2016/0012855 A1 | 1/2016 | Krishnan |

(56) References Cited

U.S. PATENT DOCUMENTS

| | | |
|---|---|---|
| 2016/0014422 A1 | 1/2016 | Su et al. |
| 2016/0027187 A1 | 1/2016 | Wang et al. |
| 2016/0050369 A1 | 2/2016 | Takenaka et al. |
| 2016/0080753 A1 | 3/2016 | Oh |
| 2016/0112489 A1 | 4/2016 | Adams et al. |
| 2016/0112704 A1 | 4/2016 | Grange et al. |
| 2016/0142697 A1 | 5/2016 | Budagavi et al. |
| 2016/0150231 A1 | 5/2016 | Schulze |
| 2016/0165257 A1 | 6/2016 | Chen et al. |
| 2016/0227214 A1 | 8/2016 | Rapaka et al. |
| 2016/0234438 A1 | 8/2016 | Satoh |
| 2016/0241836 A1 | 8/2016 | Cole et al. |
| 2016/0269632 A1 | 9/2016 | Morioka |
| 2016/0277746 A1 | 9/2016 | Fu et al. |
| 2016/0286119 A1 | 9/2016 | Rondinelli |
| 2016/0350585 A1 | 12/2016 | Lin et al. |
| 2016/0350592 A1 | 12/2016 | Ma et al. |
| 2016/0352791 A1 | 12/2016 | Adams et al. |
| 2016/0352971 A1 | 12/2016 | Adams et al. |
| 2016/0353089 A1 | 12/2016 | Gallup et al. |
| 2016/0353146 A1 | 12/2016 | Weaver et al. |
| 2016/0360104 A1 | 12/2016 | Zhang et al. |
| 2016/0360180 A1 | 12/2016 | Cole et al. |
| 2017/0013279 A1 | 1/2017 | Puri et al. |
| 2017/0026659 A1 | 1/2017 | Lin et al. |
| 2017/0038942 A1 | 2/2017 | Rosenfeld et al. |
| 2017/0054907 A1 | 2/2017 | Nishihara et al. |
| 2017/0064199 A1 | 3/2017 | Lee et al. |
| 2017/0078447 A1 | 3/2017 | Hancock et al. |
| 2017/0085892 A1 | 3/2017 | Liu et al. |
| 2017/0094184 A1 | 3/2017 | Gao et al. |
| 2017/0104927 A1 | 4/2017 | Mugavero et al. |
| 2017/0109930 A1 | 4/2017 | Holzer et al. |
| 2017/0127008 A1 | 5/2017 | Kankaanpaa et al. |
| 2017/0142371 A1 | 5/2017 | Barzuza et al. |
| 2017/0155912 A1 | 6/2017 | Thomas et al. |
| 2017/0180635 A1 | 6/2017 | Hayashi et al. |
| 2017/0200255 A1 | 7/2017 | Lin et al. |
| 2017/0200315 A1 | 7/2017 | Lockhart |
| 2017/0208346 A1 | 7/2017 | Narroschke et al. |
| 2017/0214937 A1* | 7/2017 | Lin ................ H04N 19/56 |
| 2017/0223268 A1 | 8/2017 | Shimmoto |
| 2017/0223368 A1 | 8/2017 | Abbas et al. |
| 2017/0228867 A1 | 8/2017 | Baruch |
| 2017/0230668 A1 | 8/2017 | Lin et al. |
| 2017/0236323 A1 | 8/2017 | Lim et al. |
| 2017/0244775 A1 | 8/2017 | Ha et al. |
| 2017/0251208 A1 | 8/2017 | Adsumilli et al. |
| 2017/0257644 A1 | 9/2017 | Andersson et al. |
| 2017/0272698 A1 | 9/2017 | Liu et al. |
| 2017/0272758 A1 | 9/2017 | Lin et al. |
| 2017/0278262 A1 | 9/2017 | Kawamoto et al. |
| 2017/0280126 A1* | 9/2017 | Van der Auwera ........ G06T 3/0056 |
| 2017/0287200 A1 | 10/2017 | Forutanpour et al. |
| 2017/0287220 A1 | 10/2017 | Khalid et al. |
| 2017/0295356 A1* | 10/2017 | Abbas ................ H04N 5/2251 |
| 2017/0301065 A1 | 10/2017 | Adsumilli et al. |
| 2017/0301132 A1 | 10/2017 | Dalton et al. |
| 2017/0302714 A1 | 10/2017 | Ramsay et al. |
| 2017/0302951 A1 | 10/2017 | Joshi et al. |
| 2017/0309143 A1 | 10/2017 | Trani et al. |
| 2017/0322635 A1 | 11/2017 | Yoon et al. |
| 2017/0323422 A1 | 11/2017 | Kim et al. |
| 2017/0323423 A1 | 11/2017 | Lin et al. |
| 2017/0332107 A1 | 11/2017 | Abbas et al. |
| 2017/0336705 A1 | 11/2017 | Zhou et al. |
| 2017/0339324 A1 | 11/2017 | Tocher et al. |
| 2017/0339341 A1 | 11/2017 | Zhou et al. |
| 2017/0339391 A1 | 11/2017 | Zhou et al. |
| 2017/0339392 A1 | 11/2017 | Forutanpour et al. |
| 2017/0339415 A1 | 11/2017 | Wang et al. |
| 2017/0344843 A1 | 11/2017 | Wang et al. |
| 2017/0353737 A1 | 12/2017 | Lin et al. |
| 2017/0359590 A1 | 12/2017 | Zhang et al. |
| 2017/0366808 A1 | 12/2017 | Lin et al. |
| 2017/0374332 A1 | 12/2017 | Yamaguchi et al. |
| 2017/0374375 A1 | 12/2017 | Makar et al. |
| 2018/0005447 A1 | 1/2018 | Wallner et al. |
| 2018/0005449 A1 | 1/2018 | Wallner et al. |
| 2018/0007387 A1 | 1/2018 | Izumi |
| 2018/0007389 A1 | 1/2018 | Izumi |
| 2018/0018807 A1 | 1/2018 | Lu et al. |
| 2018/0020202 A1 | 1/2018 | Xu et al. |
| 2018/0020238 A1 | 1/2018 | Liu et al. |
| 2018/0027178 A1 | 1/2018 | Macmillan et al. |
| 2018/0027226 A1 | 1/2018 | Abbas et al. |
| 2018/0027257 A1 | 1/2018 | Izumi et al. |
| 2018/0047208 A1 | 2/2018 | Marin et al. |
| 2018/0048890 A1 | 2/2018 | Kim et al. |
| 2018/0053280 A1 | 2/2018 | Kim et al. |
| 2018/0054613 A1 | 2/2018 | Lin et al. |
| 2018/0061002 A1 | 3/2018 | Lee et al. |
| 2018/0063505 A1 | 3/2018 | Lee et al. |
| 2018/0063544 A1 | 3/2018 | Tourapis et al. |
| 2018/0075576 A1 | 3/2018 | Liu et al. |
| 2018/0075604 A1 | 3/2018 | Kim et al. |
| 2018/0075635 A1 | 3/2018 | Choi et al. |
| 2018/0077451 A1 | 3/2018 | Yip et al. |
| 2018/0084257 A1 | 3/2018 | Abbas |
| 2018/0091812 A1 | 3/2018 | Guo et al. |
| 2018/0098090 A1 | 4/2018 | Lin et al. |
| 2018/0101931 A1 | 4/2018 | Abbas et al. |
| 2018/0109810 A1 | 4/2018 | Xu et al. |
| 2018/0124312 A1 | 5/2018 | Chang et al. |
| 2018/0130243 A1 | 5/2018 | Kim et al. |
| 2018/0130264 A1 | 5/2018 | Ebacher |
| 2018/0146136 A1 | 5/2018 | Yamamoto |
| 2018/0146138 A1 | 5/2018 | Jeon et al. |
| 2018/0152636 A1 | 5/2018 | Yim et al. |
| 2018/0152663 A1 | 5/2018 | Wozniak et al. |
| 2018/0160113 A1 | 6/2018 | Jeong et al. |
| 2018/0160138 A1 | 6/2018 | Park |
| 2018/0160156 A1 | 6/2018 | Hannuksela et al. |
| 2018/0164593 A1 | 6/2018 | Van der Auwera et al. |
| 2018/0167613 A1 | 6/2018 | Hannuksela et al. |
| 2018/0167634 A1 | 6/2018 | Salmimaa et al. |
| 2018/0174619 A1 | 6/2018 | Roy et al. |
| 2018/0176468 A1 | 6/2018 | Wang et al. |
| 2018/0176536 A1 | 6/2018 | Jo et al. |
| 2018/0176596 A1 | 6/2018 | Jeong et al. |
| 2018/0176603 A1 | 6/2018 | Fujimoto |
| 2018/0184101 A1 | 6/2018 | Ho |
| 2018/0184121 A1 | 6/2018 | Kim et al. |
| 2018/0191787 A1 | 7/2018 | Morita et al. |
| 2018/0192074 A1 | 7/2018 | Shih et al. |
| 2018/0199029 A1 | 7/2018 | Van der Auwera et al. |
| 2018/0199034 A1 | 7/2018 | Nam et al. |
| 2018/0199070 A1 | 7/2018 | Wang |
| 2018/0218512 A1 | 8/2018 | Chan et al. |
| 2018/0220138 A1 | 8/2018 | He et al. |
| 2018/0227484 A1 | 8/2018 | Hung et al. |
| 2018/0234700 A1 | 8/2018 | Kim et al. |
| 2018/0240223 A1 | 8/2018 | Yi et al. |
| 2018/0240276 A1 | 8/2018 | He et al. |
| 2018/0242016 A1 | 8/2018 | Lee et al. |
| 2018/0242017 A1 | 8/2018 | Van Leuven et al. |
| 2018/0249076 A1 | 8/2018 | Sheng et al. |
| 2018/0249163 A1 | 8/2018 | Curcio et al. |
| 2018/0249164 A1 | 8/2018 | Kim et al. |
| 2018/0253879 A1 | 9/2018 | Li et al. |
| 2018/0268517 A1 | 9/2018 | Coban et al. |
| 2018/0270417 A1 | 9/2018 | Suitoh et al. |
| 2018/0276789 A1 | 9/2018 | Van der Auwera et al. |
| 2018/0276826 A1 | 9/2018 | Van der Auwera et al. |
| 2018/0276890 A1 | 9/2018 | Wang |
| 2018/0288435 A1 | 10/2018 | Boyce et al. |
| 2018/0295282 A1 | 10/2018 | Boyce et al. |
| 2018/0302621 A1 | 10/2018 | Fu et al. |
| 2018/0307398 A1 | 10/2018 | Kim et al. |
| 2018/0315245 A1 | 11/2018 | Patel |
| 2018/0322611 A1 | 11/2018 | Bang et al. |
| 2018/0329482 A1 | 11/2018 | Woo et al. |
| 2018/0332265 A1 | 11/2018 | Hwang et al. |

(56) References Cited

U.S. PATENT DOCUMENTS

| | | | |
|---|---|---|---|
| 2018/0332279 A1 | 11/2018 | Kang et al. | |
| 2018/0338142 A1 | 11/2018 | Kim et al. | |
| 2018/0343388 A1 | 11/2018 | Matsushita | |
| 2018/0349705 A1 | 12/2018 | Kim et al. | |
| 2018/0350407 A1 | 12/2018 | Decoodt et al. | |
| 2018/0352225 A1 | 12/2018 | Guo et al. | |
| 2018/0352259 A1 | 12/2018 | Guo et al. | |
| 2018/0352264 A1 | 12/2018 | Guo et al. | |
| 2018/0359487 A1* | 12/2018 | Bang | H04N 19/50 |
| 2018/0374192 A1 | 12/2018 | Kunkel et al. | |
| 2018/0376126 A1 | 12/2018 | Hannuksela | |
| 2018/0376152 A1 | 12/2018 | Wang et al. | |
| 2019/0004414 A1 | 1/2019 | Kim et al. | |
| 2019/0007669 A1 | 1/2019 | Kim et al. | |
| 2019/0007679 A1 | 1/2019 | Coban et al. | |
| 2019/0007684 A1 | 1/2019 | Van der Auwera et al. | |
| 2019/0012766 A1 | 1/2019 | Yoshimi | |
| 2019/0014304 A1 | 1/2019 | Curcio et al. | |
| 2019/0026956 A1 | 1/2019 | Gausebeck et al. | |
| 2019/0028642 A1 | 1/2019 | Fujita et al. | |
| 2019/0045212 A1 | 2/2019 | Rose et al. | |
| 2019/0057487 A1 | 2/2019 | Cheng | |
| 2019/0057496 A1 | 2/2019 | Ogawa et al. | |
| 2019/0082184 A1 | 3/2019 | Hannuksela | |
| 2019/0104315 A1 | 4/2019 | Guo et al. | |
| 2019/0108611 A1 | 4/2019 | Izumi | |
| 2019/0132521 A1 | 5/2019 | Fujita et al. | |
| 2019/0132594 A1 | 5/2019 | Chung et al. | |
| 2019/0141318 A1 | 5/2019 | Li et al. | |
| 2019/0158800 A1 | 5/2019 | Kokare et al. | |
| 2019/0200016 A1 | 6/2019 | Jang et al. | |
| 2019/0215512 A1 | 7/2019 | Lee et al. | |
| 2019/0215532 A1* | 7/2019 | He | H04N 19/172 |
| 2019/0230285 A1 | 7/2019 | Kim | |
| 2019/0230337 A1 | 7/2019 | Kim | |
| 2019/0230377 A1 | 7/2019 | Ma et al. | |
| 2019/0236990 A1 | 8/2019 | Song et al. | |
| 2019/0238888 A1 | 8/2019 | Kim | |
| 2019/0246141 A1 | 8/2019 | Kim et al. | |
| 2019/0253622 A1 | 8/2019 | Van der Auwera et al. | |
| 2019/0253624 A1 | 8/2019 | Kim | |
| 2019/0268594 A1 | 8/2019 | Lim et al. | |
| 2019/0273929 A1 | 9/2019 | Ma et al. | |
| 2019/0273949 A1 | 9/2019 | Kim et al. | |
| 2019/0281217 A1 | 9/2019 | Kim | |
| 2019/0281290 A1 | 9/2019 | Lee et al. | |
| 2019/0289324 A1 | 9/2019 | Budagavi | |
| 2019/0289331 A1 | 9/2019 | Byun | |
| 2019/0297341 A1 | 9/2019 | Zhou | |
| 2019/0297350 A1 | 9/2019 | Lin et al. | |
| 2019/0306515 A1 | 10/2019 | Shima | |
| 2019/0387251 A1 | 12/2019 | Lin et al. | |
| 2020/0029077 A1 | 1/2020 | Lee et al. | |
| 2020/0036976 A1 | 1/2020 | Kanoh et al. | |
| 2020/0045323 A1 | 2/2020 | Hannuksela | |
| 2020/0074687 A1 | 3/2020 | Lin et al. | |
| 2020/0077092 A1 | 3/2020 | Lin et al. | |
| 2020/0084441 A1 | 3/2020 | Lee et al. | |
| 2020/0120340 A1 | 4/2020 | Park et al. | |
| 2020/0120359 A1 | 4/2020 | Hanhart et al. | |
| 2020/0137401 A1 | 4/2020 | Kim et al. | |
| 2020/0162731 A1 | 5/2020 | Kim et al. | |
| 2020/0213570 A1 | 7/2020 | Shih et al. | |
| 2020/0213571 A1 | 7/2020 | Kim et al. | |
| 2020/0213587 A1 | 7/2020 | Galpin et al. | |
| 2020/0244957 A1 | 7/2020 | Sasai et al. | |
| 2020/0252650 A1 | 8/2020 | Shih et al. | |

FOREIGN PATENT DOCUMENTS

| | | |
|---|---|---|
| JP | 2012-160886 A | 8/2012 |
| JP | 2014-176034 A | 9/2014 |
| KR | 2017-0015938 A | 2/2017 |
| WO | WO 2012/044709 A1 | 4/2012 |
| WO | WO 2015/138979 A2 | 9/2015 |
| WO | WO 2015/184416 A1 | 12/2015 |
| WO | WO 2016/076680 A1 | 5/2016 |
| WO | WO 2016/140060 A1 | 9/2016 |
| WO | WO 2017/125030 A1 | 7/2017 |
| WO | WO 2017/127816 A1 | 7/2017 |
| WO | WO 2018/118159 A1 | 6/2018 |

OTHER PUBLICATIONS

Kammachi et al.; "AHG8: Test results for viewport-dependent pyramid, cube map, and equirectangular panorama schemes"; JVET-D00078; Oct. 2016; 7 pages.

He et al.; "AHG8: InterDigital's projection format conversion tool"; JVET-D0021; Oct. 2016; 17 pages.

Yip et al.; "Technologies under Considerations for ISO/IEC 23000-20 Omnidirectional Media Application Format"; ISO/IEC JTC1/SC29/WG11 MPEG2017/W16637; Jan. 2017; 50 pages.

International Patent Application No. PCT/US2018/018246; Int'l Search Report and the Written Opinion; dated Apr. 20, 2018; 15 pages.

Tosic et al.; "Multiresolution Motion Estimation for Omnidirectional Images"; IEEE 13$^{th}$ European Signal Processing Conference; Sep. 2005; 4 pages.

He et al.; "AHG8: Geometry padding for 360 video coding"; Joint Video Exploration Team (JVET); Document: JVET-D0075; Oct. 2016; 10 pages.

Vishwanath et al.; "Rotational Motion Model for Temporal Prediction in 360 Video Coding"; IEEE 19$^{th}$ Int'l Workshop on Multimedia Signal Processing; Oct. 2017; 6 pages.

Sauer et al.; "Improved Motion Compensation for 360 Video Projected to Polytopes" Proceedings of the IEEE Int'l Conf. on Multimedia and Expo; Jul. 2017; p. 61-66.

International Patent Application No. PCT/US2018/017124; Int'l Search Report and the Written Opinion; dated Apr. 30, 2018; 19 pages.

Boyce et al.; "Common Test Conditions and Evaluation Procedures for 360 degree Video Coding"; Joint Video Exploration Team; ITU-T SG 16 WP 3 and ISO/IEC JTC 1/SC 29/WG 11; Doc. JVET-D1030; Oct. 2016; 6 pages.

Li et al.; "Projection Based Advanced Motion Model for Cubic Mapping for 360-Degree Video"; Cornell University Library; 2017; 5 pages.

Zheng et al.; "Adaptive Selection of Motion Models for Panoramic Video Coding"; IEEE Int'l Conf. Multimedia and Expo; Jul. 2007; p. 1319-1322.

He et al.; "AHG8: Algorithm description of InterDigital's projection format conversion tool (PCT360)"; Joint Video Exploration Team; ITU-T SG 16 WP 3 and ISO/IEC JTC 1/SC 29/WG 11; Doc. JVET-D0090; Oct. 2016; 6 pages.

International Patent Application No. PCT/US2017/051542; Int'l Search Report and the Written Opinion; dated Dec. 7, 2017; 17 pages.

International Patent Application No. PCT/US2017/051542; Int'l Preliminary Report on Patentability; dated Jul. 4, 2019; 10 pages.

Choi et al.; "Text of ISO/IEC 23000-20 CD Omnidirectional Media Application Format"; Coding of Moving Pictures and Audio; ISO/IEC JTC1/SC29/WG11 N16636; Jan. 2017; 48 pages.

International Patent Application No. PCT/US2018/017124; Int'l Preliminary Report on Patentability; dated Aug. 29, 2019; 12 pages.

International Patent Application No. PCT/US2018/018246; Int'l Preliminary Report on Patentability; dated Sep. 6, 2019; 8 pages.

Sauer et al.; "Geometry correction for motion compensation of planar-projected 360VR video"; Joint Video Exploration Team; Document: JVET-D0067; Oct. 2016; 13 pages.

* cited by examiner

100

200

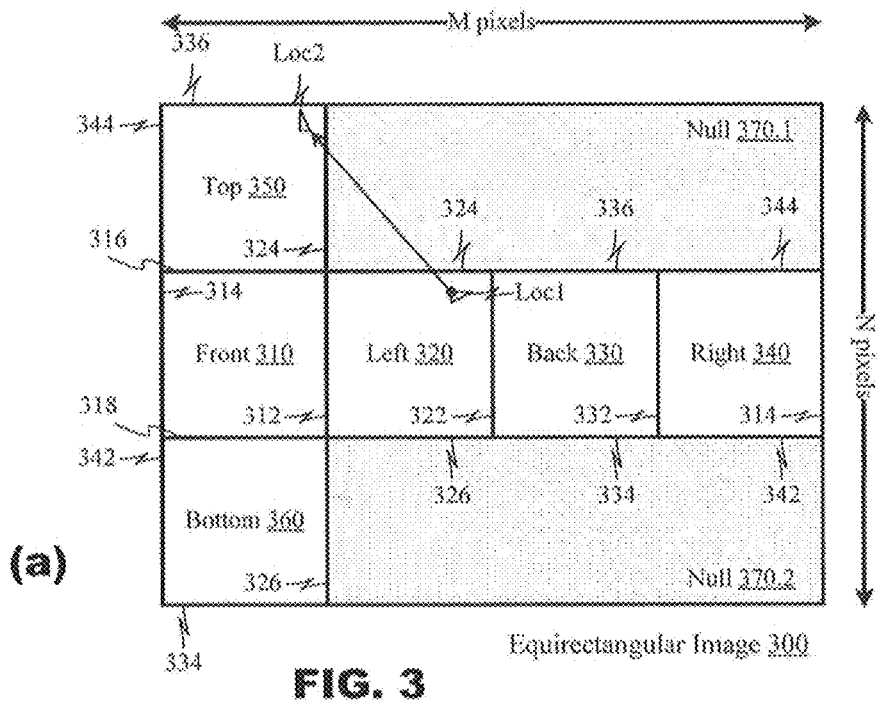
FIG. 3
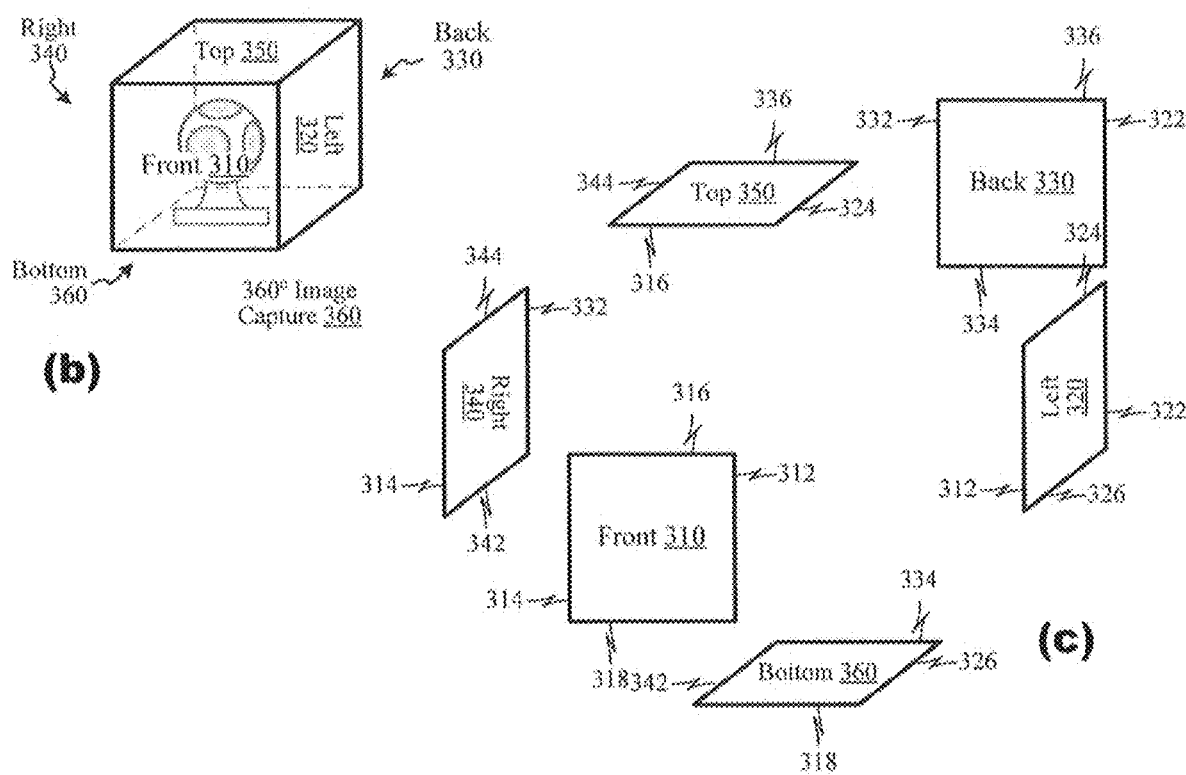

400

500

(a)

| Null Image 670.1 | Top 650 | Null Image 670.2 | |
|---|---|---|---|
| Right 640 | Front 610 | Left 620 | Back 630 |
| Null Image 670.3 | Bottom 660 | Null Image 670.4 | |

| Padded Image 680.1 [Right] | Top 650 | Padded Image 680.2 [Top] | Padded Image 680.3 [Top] |
|---|---|---|---|
| Right 640 | Front 610 | Left 620 | Back 630 |
| Padded Image 680.4 [Right] | Bottom 660 | Padded Image 680.5 [Bottom] | Padded Image 680.6 [Bottom] |

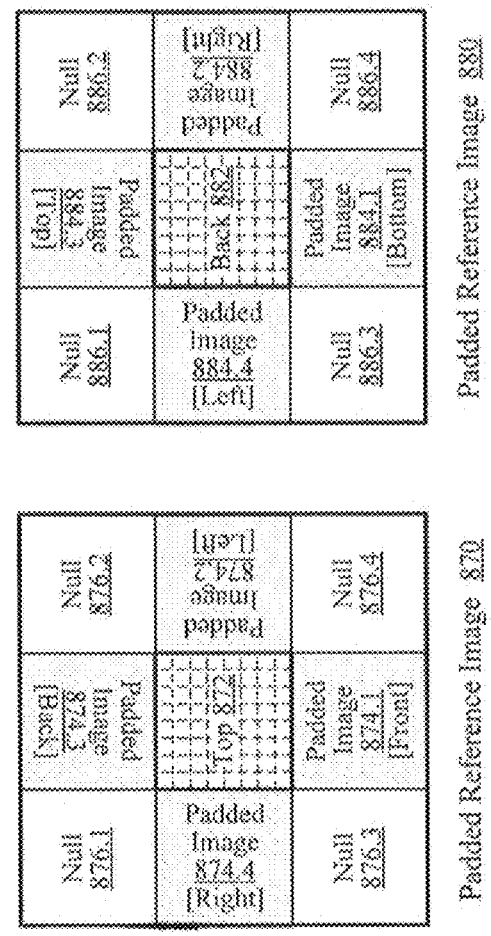
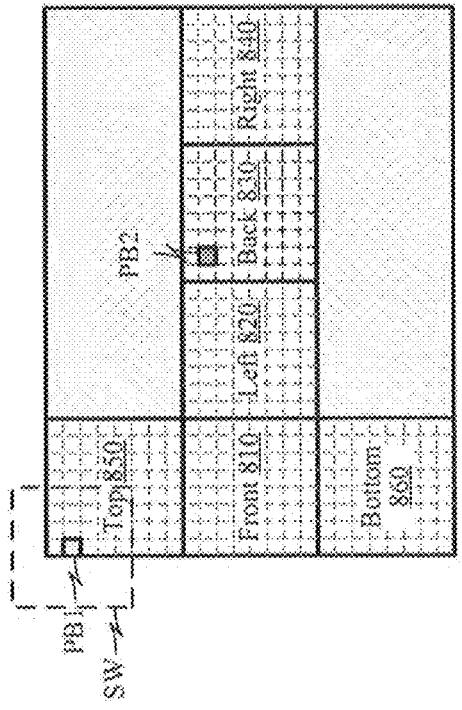
FIG. 8
800
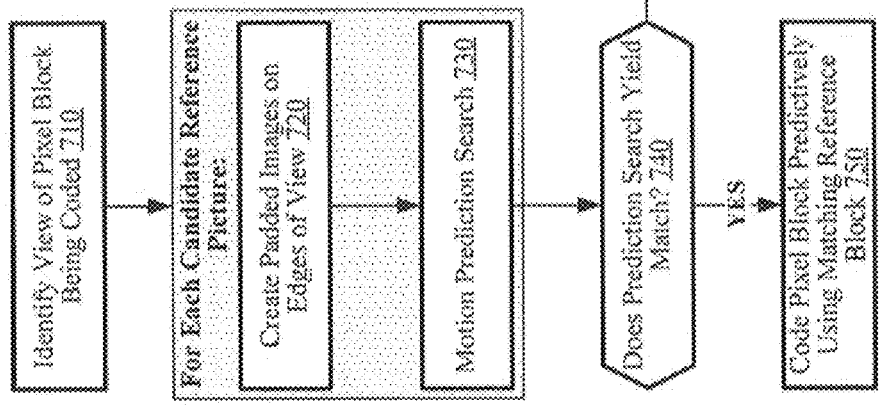
FIG. 7
700

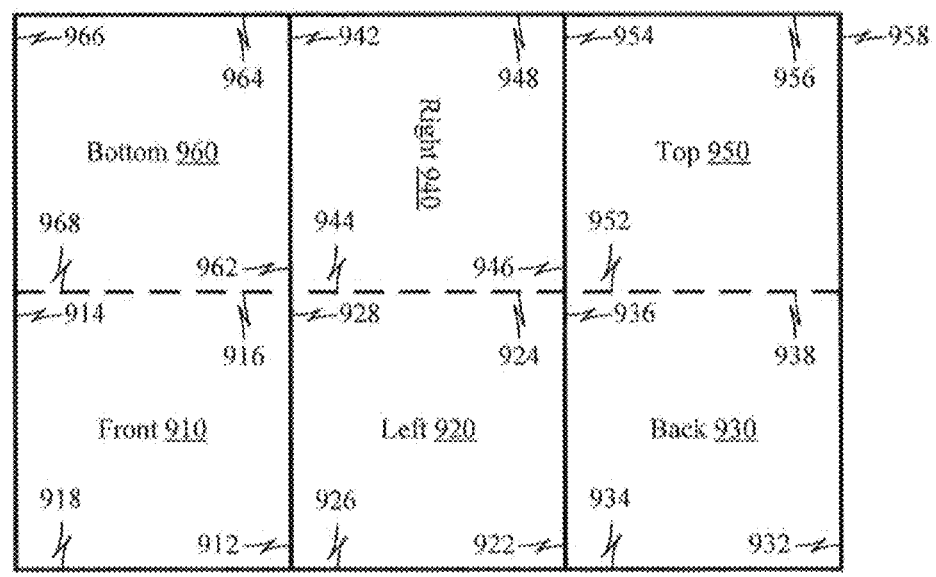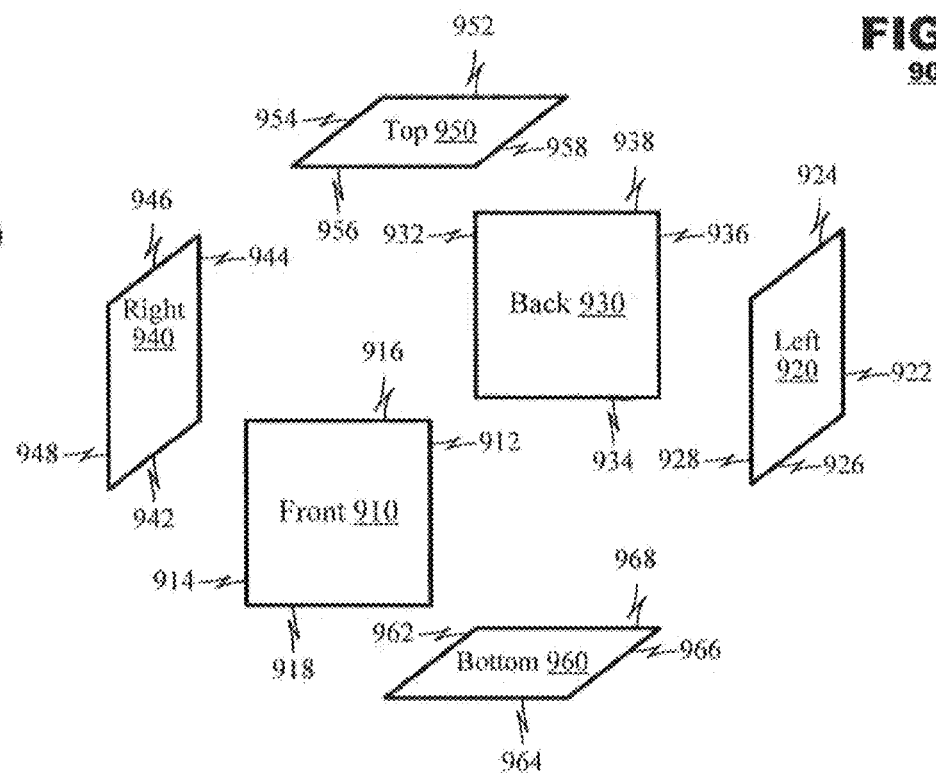
FIG. 9
900

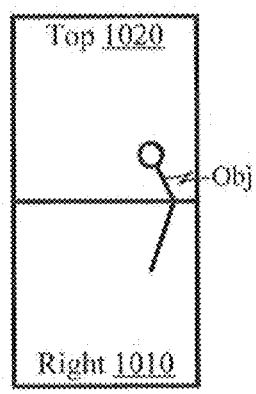
(a)
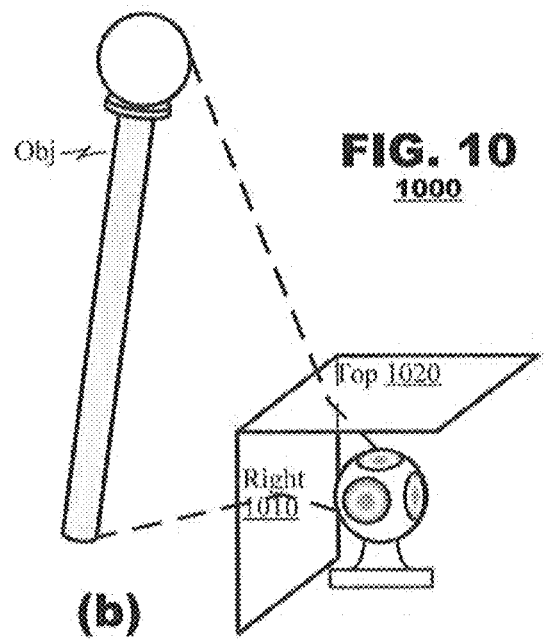
FIG. 10
1000
(b)
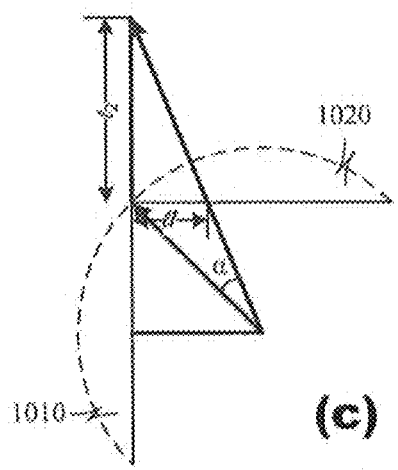
(c)
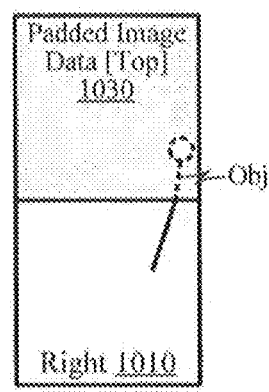
(d)

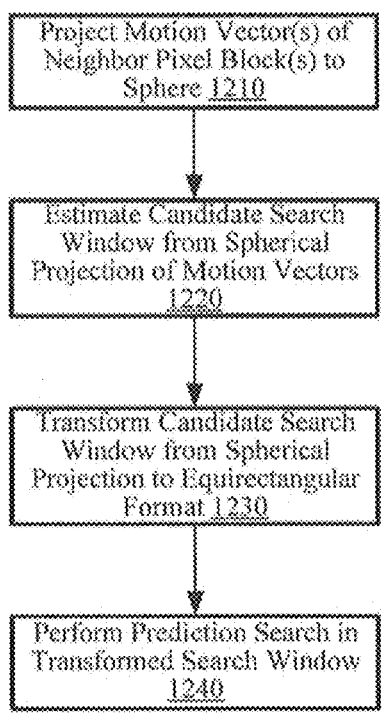
FIG. 12
1200
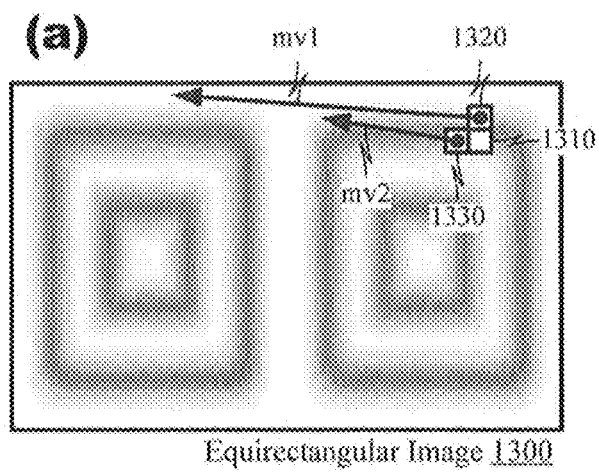
Equirectangular Image 1300
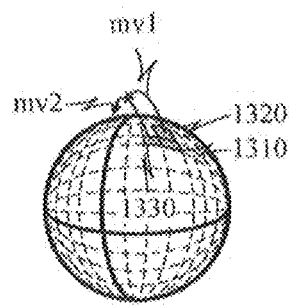
Spherical Projection 1350
FIG. 13
1300

1400

1500

1600

VIDEO CODING TECHNIQUES FOR MULTI-VIEW VIDEO

BACKGROUND

The present disclosure relates to coding/decoding systems for multi-view imaging system and, in particular, to use of coding techniques that originally were developed for flat images, for multi-view image data.

Video coding system typically reduced bandwidth of video signals by exploiting spatial and/or temporal redundancy in video content. A given portion of input data (called a "pixel block" for convenience) is compared to a previously-coded image to identify similar content. If the search identifies an appropriate match, the input pixel block is coded differentially with respect to the matching data (a "reference block") from the prior image. Many modern coding protocols, such as ITU-T H.265, H.264, H.263 and their predecessors, have been designed around these basic principles.

Such video coding protocols operate on an assumption that image data is "flat," meaning that the image content represents a continuous two-dimensional field of view. Modern video systems are being developed, however, that do not operate under these assumptions.

Multi-view imaging is one application where image data is not flat. Images generated by a multi-view imaging system may represent image data in a two dimensional array of image data but spatial discontinuities may exist in image data contained within the image. Object motion that is relatively small in free space may be represented by large spatial movements within the image data that represents the object. Accordingly, modern coding systems may fail to recognize these instances of motion as an opportunity for differential coding. By failing to recognize such phenomena, such coding systems do not code image data as efficiently as they might.

Accordingly, the inventors recognized a need to improve coding system to accommodate motion effects that may arise in multi-view image data.

BRIEF DESCRIPTION OF THE DRAWINGS

FIG. 3(a)-3(c) illustrate an exemplary cube map image and its relationship to image content in free space.

FIG. 6(a)-6(b) illustrate another exemplary cube map image and a padded image that may be generated therefrom according to an embodiment of the present disclosure.

FIG. 7 illustrates a method according to another embodiment of the present disclosure.

FIG. 8(a) illustrates an exemplary cube map image and FIGS. 8(b)-(c) illustrate exemplary padded reference images that may be coded by embodiments of the present disclosure.

FIG. 9(a)-9(b) illustrate another exemplary cube map image and its relationship to image content in free space.

FIGS. 10(a)-(d) illustrate exemplary projections of multi-view image data according to an embodiment of the present disclosure.

FIG. 12 illustrates a method according to an embodiment of the present disclosure.

FIGS. 13(a)-(b) illustrate an exemplary equirectangular image that might be processed by the method of FIG. 12 and spherical projections therefor.

DETAILED DESCRIPTION

Embodiments of the present disclosure provide video coding/decoding techniques for cube map images. According to these techniques, padded reference images are generated for use during predicting input data. A reference image is stored in a cube map format. A padded reference image is generated from the reference image in which image data of a first view contained in reference image is replicated and placed adjacent to a second view contained in the cube map image. When coding a pixel block of an input image, a prediction search may be performed between the input pixel block and content of the padded reference image. When the prediction search identities a match, the pixel block may be coded with respect to matching data from the padded reference image. Presence of replicated data in the padded reference image is expected to increase the likelihood that adequate prediction matches will be identified for input pixel block data, which will increase overall efficiency of the video coding.

Figure 1:
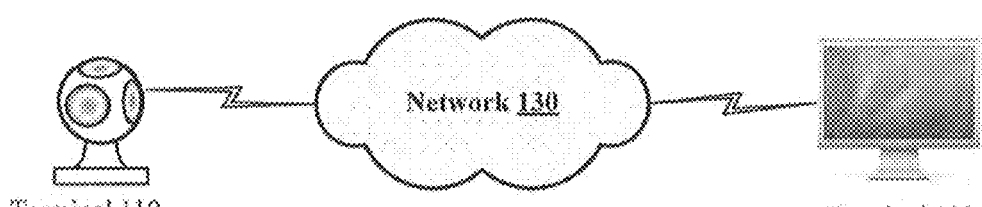
FIG. 1 illustrates a system suitable for use with embodiments of the present disclosure.

FIG. 1 illustrates a system 100 in which embodiments of the present disclosure may be employed. The system 100 may include at least two terminals 110-120 interconnected via a network 130. The first terminal 110 may have an image source that generates multi-view video. The terminal 110 also may include coding systems and transmission systems (not shown) to transmit coded representations of the multi-view video to the second terminal 120, where it may be consumed. For example, the second terminal 120 may display the multi-view video on a local display, it may execute a video editing program to modify the multi-view video, or may integrate the multi-view into an application (for example, a virtual reality program), may present in head mounted display (for example, virtual reality applications) or it may store the multi-view video for later use.

FIG. 1 illustrates components that are appropriate for unidirectional transmission of multi-view video, from the first terminal 110 to the second terminal 120. In some applications, it may be appropriate to provide for bidirectional exchange of video data, in which case the second terminal 120 may include its own image source, video coder and transmitters (not shown), and the first terminal 110 may include its own receiver and display (also not shown). If it is desired to exchange multi-view video bi-directionally, then the techniques discussed hereinbelow may be replicated to generate a pair of independent unidirectional exchanges of multi-view video. In other applications, it would be permissible to transmit multi-view video in one direction (e.g., from the first terminal 110 to the second terminal 120) and transmit "flat" video (e.g., video from a limited field of view) in a reverse direction.

In FIG. 1, the second terminal 120 is illustrated as a computer display but the principles of the present disclosure are not so limited. Embodiments of the present disclosure find application with laptop computers, tablet computers, smart phones, servers, media players, virtual reality head mounted displays, augmented reality display, hologram displays, and/or dedicated video conferencing equipment. The network 130 represents any number of networks that convey coded video data among the terminals 110-120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained hereinbelow.

Figure 2:
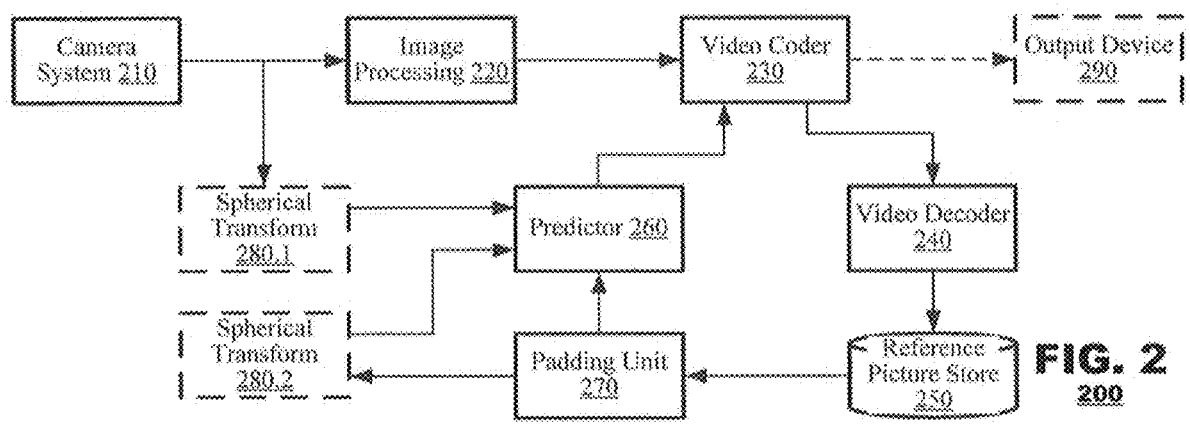
FIG. 2 is a functional block diagram of a coding system according to an embodiment of the present disclosure.

FIG. 2 is a functional block diagram of a coding system 200 according to an embodiment of the present disclosure. The system 200 may include an image source 210, an image processing system 220, a video coder 230, a video decoder 240, a reference picture store 250, a predictor 260, a padding unit 270 and, optionally, a pair of spherical transform units 280.1, 280.2. The image source 210 may generate image data as a multi-view image, containing image data of a field of view that extends around a reference point in multiple directions. The image processing system 220 may convert the image data from the image source 210 as needed to fit requirements of the video coder 230. The video coder 230 may generate a coded representation of its input image data, typically by exploiting spatial and/or temporal redundancies in the image data. The video coder 230 may output a coded representation of the input data that consumes less bandwidth than the input data when transmitted and/or stored.

The video decoder 240 may invert coding operations performed by the video encoder 230 to obtain a reconstructed picture from the coded video data. Typically, the coding processes applied by the video coder 230 are lossy processes, which cause the reconstructed picture to possess various errors when compared to the original picture. The video decoder 240 may reconstruct picture of select coded pictures, which are designated as "reference pictures," and store the decoded reference pictures in the reference picture store 250. In the absence of transmission errors, the decoded reference pictures will replicate decoded reference pictures obtained by a decoder (not shown in FIG. 2).

The predictor 260 may select prediction references for new input pictures as they are coded. For each portion of the input picture being coded (called a "pixel block" for convenience), the predictor 260 may select a coding mode and identify a portion of a reference picture that may serve as a prediction reference search for the pixel block being coded. The coding mode may be an inter-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture. The predictor 260 may operate in padded reference image data generated by the padding unit 270 as described herein.

In an embodiment, the predictor 260 may search for prediction references of pictures being coded operating on input picture and reference picture that has been transformed to a spherical projection representation. The spherical transform units 280.1, 280.2 may transform the input picture and the reference picture to the spherical projection representations.

When an appropriate prediction reference is identified, the predictor 260 may furnish the prediction data to the video coder 230. The video coder 230 may code input video data differentially with respect to prediction data furnished by the predictor 260. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 230 should consume less bandwidth than the input data when transmitted and/or stored. The coding system 200 may output the coded video data to an output device 290, such as a transmitter (not shown) that may transmit the coded video data across a communication network 130 (FIG. 1) or a storage device (also not shown) such as an electronic-, magnetic- and/or optical storage medium.

FIG. 3 illustrates a cube map image 300 suitable for use with embodiments of the present invention. As indicated, an omnidirectional camera may capture image data in several fields of view, representing a "front" view, 310 a "left" view 320, a "back" view 330, a "right" view 340, a "top" view 350 and a "bottom" view, 360 respectively. Image data of these views 310-360 may be assembled into an M×N pixel image according to the spatial relationships that exist among the different fields of view.

FIG. 3(a) illustrates orientation of the views 310-360 in the larger cube map image 300. FIG. 3(b) illustrates orientation of the views 310-360 about a camera that captures images corresponding to these views 310-360. For convenience, the image data captured for each of these fields of view will be described as "views" 310-360 when describing content of the cube map image 300.

FIG. 3(c) is an exploded view of the views' spatial orientation, illustrating edges 312-318, 322-326, 332-336, 342-344 that occur between the views 310-360. Thus, as illustrated in FIG. 3(b), image content from the front view 310 that is immediately adjacent to edge 312 is spatially adjacent to pixel content from the left view 320 that also is immediately adjacent to edge 312. Similarly, pixel content from the front view 310 that is immediately adjacent to edge 314 is spatially adjacent to pixel content from the right view 340 that also is immediately adjacent to edge 314. Pixel content from the front view 310 that is immediately adjacent to edges 316 and 318 are spatially adjacent to pixel content from the top view 350 and the bottom view 360, respectively, that are immediately adjacent to those edges.

The views 310-360 may be arranged in the cube map image 300 to retain continuity across some of the boundaries between the views 310-360. As illustrated in FIG. 3(a), image continuity may be maintained between the front view 310 and the neighboring left, top and bottom views 320, 350 and 360 along their respective edges 312, 316 and 318. Image continuity may be maintained between the left view 320 and the front and back views 310, 330, respectively, along edges 312 and 322. Image continuity may be maintained between the back view 330 and the left and right views 320, 340 respectively along edges 322 and 332.

Image continuity is not maintained, however, across edges 314, 324, 326, 334, 336, 342, 344. Thus, image content from the views 310-360 that are adjacent to these edges will not be in proximity to each other even though they represent adjacent image content. For example, although content from the front view 310 and the right view 340 that are adjacent to edge 314 are adjacent to each other spatially as illustrated in FIG. 3(*c*), they appear along opposite edges of the cube map image 300 illustrated in FIG. 3(*a*). Similarly, image content along the edges 324, 336 and 344 of the top view 350 are distant from their counterparts along the edges 324, 336 and 344 of the left view 320, the back view 330 and the right view 340, respectively. Moreover, image content along the edges 326, 334 and 342 of the bottom view 360 are distant from their counterparts along the edges 326, 334 and 342 of the left view 320, the back view 330 and the right view 340, respectively.

Figure 4:
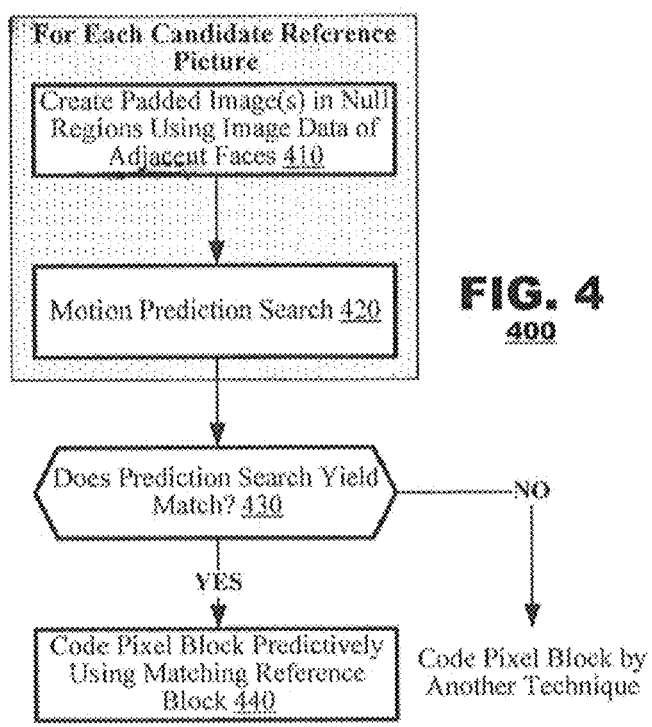
FIG. 4 illustrates a method according to an embodiment of the present disclosure.

FIG. 4 illustrates a method according to an embodiment of the present disclosure. The method 400 may process reference pictures arranged in a cube map image format such as shown in FIG. 3(*a*). For each candidate reference picture, the method 400 may create padded images in null regions of the source cube map image (box 410). The method 400 also may perform a motion prediction search for an input pixel block across the padded image generated at box 410 (box 420). The method 400 may determine whether the prediction search generates a match (box 430) and, if so, the method 400 may code the input pixel block predictive using a matching reference block that is identified from the motion prediction search (box 440). Otherwise, the method 400 may code the input pixel block by an alternate technique, such as by intra coding.

Figure 5:
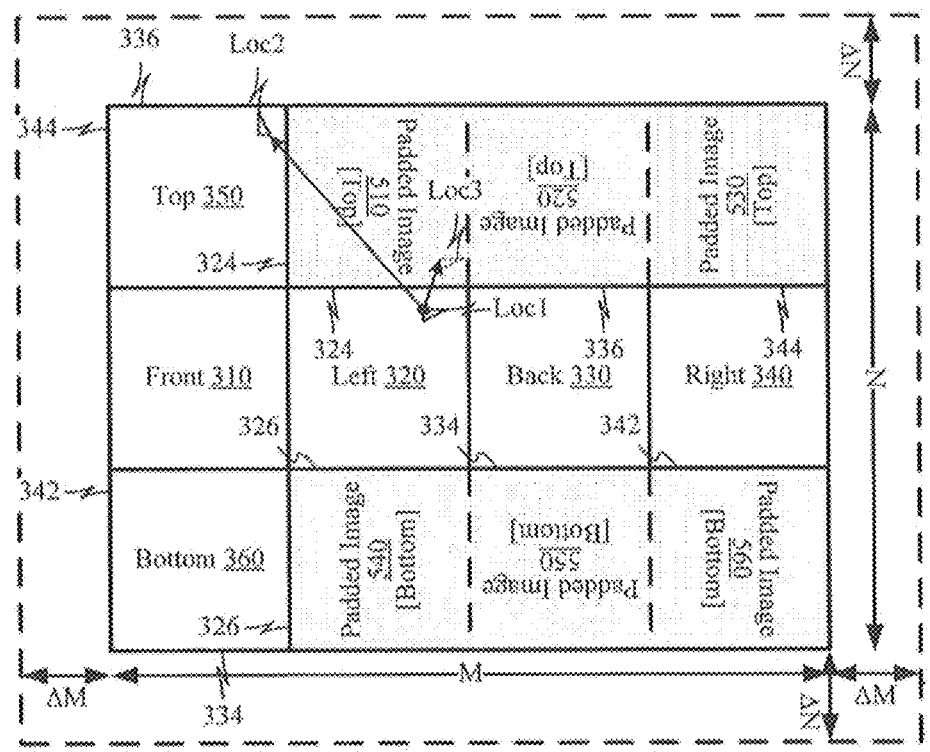
FIG. 5 illustrates a padded cube map image according to an embodiment of the present disclosure.

FIG. 5 illustrates a padded cube map image 500 according to an embodiment of the present disclosure. The padded cube map image 500 may include image data from the front, left, back, right, top and bottom views 310-360 that are generated from creation of a source cube map image, as in FIG. 3(*a*). Regions of the cube map image 300 that were null regions 370.1, 370.2, shown in FIG. 3(*a*), may contain image data from the views that border the edges 324, 326, 334, 336, 342 and 344 as necessary to develop continuous image content across those edges. Thus, in the case of null region 370.1 (FIG. 3), image content of the top view 350 may be placed as padded images 510, 520 and 530 and each instance of the top view 350 may be rotated to align its edges with the edges 324, 336 and 344 of the left view 320, the back view 330 and the right view 340. Similarly, in the case of null region 370.2 (FIG. 3), image content of the bottom view 360 may be placed as padded images 540, 550 and 560, an each instance of the bottom image 360 may be rotated to align its edges with the edges 326, 334 and 342 of the left view 320, the back view 330 and the right view 340. In FIG. 5, text of the padded images 510-560 illustrate rotations of image data that may occur to align data to these edges 324, 326, 334, 336, 342 and 344.

Provision of padded images increases likelihood that predictive video coders may detect movement of image content across images. Consider an object illustrated in FIG. 3 in the left view 320 at location Loc1. Image content of the object may have moved from a location Loc2 in a top view 350 in a previously-coded reference frame. Therefore, the image content of the object at location Loc2 in the top view 350 may serve as a prediction reference for the object at location Loc1. In practice, however, a video coder that searches for a prediction match for an object at location Loc1 in a frame being coded may not detect the image content at location Loc2 of a reference frame, due either to the object's distance from location Loc1 in the equirectangular image 300, to its orientation, or both.

With use of padded images as illustrated in FIG. 5, a redundant copy of the object may be provided at a location Loc3 in a reference frame. The image content of the top view 350 appears in the padded view 510 in an orientation that adjoins image content of the top view 350 at edge 324 with image content of the left view 320 at edge 324. The location and orientation of the image content at location Loc3 is must closer to the object content being coded (at location Loc1) and, therefore, it has a higher likelihood of serving as a basis of prediction by a predictive video coder.

The principles of the present invention find application with cube map image of a variety of formats. Another format is illustrated in FIG. 6, which illustrates front, left, back, right, top and bottom views 610-660 in an alternative representation with four null regions 670.1-670.4 (FIG. 6(*a*)). Here, padded images 680.1-680.6 may be provided in the null regions 670.1-670.4 which are drawn from respective ones of the views 610-660 (FIG. 6(*b*)). In this example, the padded images 680.1 and 680.4 may be derived from the right view 640 and the padded images 680.2-680.3 and 680.5-680.6 may be derived from the top view 650.

Returning to FIG. 5, it can be seen that use of padded images does not create image continuity across all edges. For example, with respect to the top view 350, continuity is not maintained across edges 324, 344 or 336. The padded image 510 contains data of the top view which does not create continuity across the edge 324 (even though it does create continuity across the counterpart edge 324 at the left view 320). Further, there is no image data at edges 336 and 344, which represent boundary edges of the image 500. Similarly, with respect to the bottom view 360, continuity is not maintained across edges 326, 334 or 342. The padded image 540 contains data of the bottom image which does not create continuity across the edge 326 (even though it does create continuity across the counterpart edge 326 at the left view 320). Further, there is no image data at edges 334 and 342, which represent boundary edges of the image 500. Accordingly, prediction searches likely would not identify matches across such boundaries and, optionally, may be constrained to avoid searching across edges 324, 326, 334, 336, 342, 344 having discontinuities in image content after padding is applied.

In a further embodiment, a reference image may be expanded by padding about a periphery of the image. Thus, a reference image that is processed by video encoders and decoders as an M×N pixel image may be expanded by amounts $\Delta M$ and $\Delta N$, respectively, along a periphery of the image, yielding a (M+2$\Delta M$)×(N+2$\Delta N$) image. Padded image data may be provided along peripheral edges of the M×N pixel image to provide padded image data along edges of the views 310, 340, 350, 360 at the periphery. Such padded image data may be drawn from the views that abut the peripheral edges in the cube map view. For example, right view data may be provided along a peripheral edge of the front view 310 and front view data may be provided along a peripheral edge of the right view 340. Thus, prediction searches may extend from peripheral edges of the M×N image into the padded regions provided by the $\Delta M$ and/or $\Delta N$ expansion.

FIG. 7 illustrates a method 700 according to another embodiment of the present disclosure. The method 700 may be performed for each pixel block of a cube map image being coded. The method 700 may identify a view associated with a pixel block being coded (box 710). Then, for each candidate reference picture that may serve as a prediction reference for the input pixel block, the method 700 may create a padded reference image using image data from views that are adjacent to the view identified in box 710 (box 720). The method 700 may perform a motion prediction search 730 within the padded reference image created at box 720 (box 730). After consideration of the candidate reference pictures, the method 700 may determine if a prediction search yielded a match (box 740). If so, the method 700 may code the input pixel block predictive using a matching reference block that is identified from the motion prediction search (box 750). Otherwise, the method 700 may code the input pixel block by an alternate technique, such as by intra coding.

FIG. 8 illustrates an exemplary cube map image 800 that may be coded by the method of FIG. 7. FIG. 8(a) illustrates the cube map image 800 having front, left, back, right, top and bottom views 810-880 that are partitioned respectively into pixel blocks. FIG. 8(b) illustrates a padded reference image 870 that may be generated when a pixel block PB1 is coded from a top view 850 and FIG. 8(c) illustrates a padded reference image 880 that may be generated when a pixel block PB1 is coded from a back view 830.

Referring to FIG. 8(b), when a pixel block PB1 from a top view 850 of an input image 800 is coded, the method 700 may generate a padded reference image 870 that includes image data from the top view 872 of the reference picture and padded images 874.1-874.4 provided along edges of the top view 872. In this instance, the padded images 874.1-874.4 respectively contain image data of the front view 874.1 of the reference image, the left view 874.2 of the reference image, the back view 874.3 of the reference image and the right view 874.4 of the reference image. The image data of these views 874.1-874.4 each may be rotated to provide continuity of image data across edges of the top view 872.

The padded reference image 870 may provide continuous reference picture data along all edges of the view 850 in which a pixel block PB1 is coded. Thus, when coding a pixel block PB1, a video coding system may search for prediction references across edges of the view 850 in which the pixel block PB1 is located.

Similarly, referring to FIG. 8(c), when a pixel block PB2 from a back view 830 of an input image 800 is coded, the method 700 may generate a padded reference image 880 that includes image data from the back view 882 of the reference picture and padded images 884.1-884.4 provided along edges of the back view 882. In this instance, the padded images 884.1-884.4 respectively contain image data of the bottom view 884.1 of the reference image, the right view 884.2 of the reference image, the top view 884.3 of the reference image and the left view 884.4 of the reference image. The image data of these views 884.1-884.4 each may be rotated to provide continuity of image data across edges of the top view 882.

The padded reference image 880 may provide continuous reference picture data along all edges of the view 830 in which a pixel block PB2 is coded. Thus, when coding a pixel block PB2, a video coding system may search for prediction references across edges of the view 80 in which the pixel block PB2 is located.

The operation of method 700 may be repeated for pixel blocks of each of the views 810-860 of an image 800 being coded.

FIGS. 8(b) and 8(c) each illustrate respective null regions 876.1-876.4 and 886.1-886.4 provided in areas between instances of padded image data 874.1-874.4 and 884.1-884.4. In an embodiment, it is unnecessary to provide image data in these null regions. Alternatively, however, it is permissible to replicate padded image data from an adjacent image. For example, null region 876.3 is adjacent to padded images 847.1 and 847.4; one of the padded images may be replicated in the null region 876.3, if desired.

Although FIG. 7 illustrates the creation of padded images (box 720) may be performed anew for each pixel block being coded, in practice, the creation of a padded image may be performed once and reused for coding all pixel blocks within a given view. Thus, when coding pixel blocks in a top view 850 of an input image 800, a single instance of the padded reference image 870 may be created for use in coding all pixel blocks from the top view 850. Similarly, when coding pixel blocks in a back view 830 of an input image 800, a single instance of the padded reference image 880 may be created for use in coding all pixel blocks from the back view 830.

Moreover, it is not required to use all image data of a given view when building a padded reference image. Instead, is it sufficient to provide a portion of padded image data sufficient to develop image data in a region that corresponds to a search window of the motion prediction search being performed. For example, FIG. 8(a) illustrates an exemplary search window SW provided around pixel block PB1 in the top view 850 of the image 800 being coded. It is sufficient to develop a padded reference image having data sufficient to cover a region corresponding to a union of the search windows for all pixel blocks of a given view (such as view 850). Thus, a padded reference image may be obtained from image data from a reference image corresponding to a co-located view as the pixel block being coded and portions of images adjacent to the co-located view. In FIG. 8(b), a top view 872 of the reference image is co-located with the view 850 in which PB1 resides and portions of the front, left, back and right views from the reference image may be used to build a padded reference image 870 that is co-extensive with a union of the search windows for all pixel blocks of the view 850. It would not be necessary to use the entirety of the front, left, back and right views from the reference image if the search windows around pixel blocks in the top view 850 (FIG. 8(a)) cannot reach them.

The method 700 of FIG. 7 may find application with cube map image data in alternate formats. For example, FIG. 9(a) illustrates a cube map image 900 having a layout that avoids use of null regions. In this example, the cube map image 900 contains a front view, 910 a left view 920, a back view 930, a right view 940, a top view 950 and a bottom view 960 respectively, which are developed from fields of view illustrated in FIG. 9(b). The views 910-960 may be laid out in the image in a regular array, such as the 3×2 array illustrated in FIG. 9(a). In doing so, however, the cube map image 900 introduces additional discontinuities along view edges that might have been avoided in a different layout (such as the layouts illustrated in FIGS. 3 and 6).

In the example of FIG. 9, the front, left and back views 910, 920, 930 are arranged to preserve image continuity across edges 912|928 and 922|936. Similarly the right, top and bottom views are arranged to preserve image continuity across edges 946|954 and 942|962.

Discontinuities are developed at seams between the front and bottom views 910, 960, between the left and right views 920, 940, and between the top and back views 930, 950. For example, where the front and bottom views 910, 960 meet in the cube map image 900, edges 916 and 968 are placed adjacent to each other even though they are not adjacent in free space (represented by FIG. 9(b)). Similarly, where the left and right views 920, 940 meet in the cube map image, edges 924 and 944 are placed adjacent to each other even though they are not adjacent to each other in free space. And, further, where the back and top views 930, 950 meet in the cube map image 900, the edges 938 and 952 are placed adjacent to each other but oriented differently (the top view is flipped) from their orientation in free space. These discontinuities are illustrated with dashed lines in FIG. 9(a) where seams between image views that are continuous are represented with solid lines.

Using the technique of FIG. 7, padded reference images may be developed for the views of cube map image such as illustrated in FIG. 9. When coding pixel block data from a top view 950 of a cube map image 900, padded reference images may be derived from a top view of a reference picture and from padded images derived from front, left, back and right images as illustrated in FIG. 8(b). Similarly, when coding pixel block data from a back view 930 of a cube map image 900, padded reference images may be derived from a back view of a reference picture and from padded images derived from bottom, right, top and left images of the reference picture as illustrated in FIG. 8(c).

In an embodiment, image transformation may be performed on padded image data prior to a motion prediction search. Such transformations may be performed to project image data from the padded image to a domain of the view to which the padded image data is appended.

FIG. 10 illustrates one such projection according to an embodiment of the present disclosure. As illustrated in FIG. 10(a), it is possible that image data of an object will appear in multiple views of a cube map image 1000. For example, image data of an object Obj (FIG. 10(b)) is illustrated as appearing in both a right view 1010 and a top view 1020 of a cube map image 1000. Owing to different perspectives of the image sensor(s) that capture image data of these views 1010, 1020, the object may appear with distortion if the right and top views 1010, 1020 were treated as a single, "flat" image. In an embodiment, padded image data may be subject to transform to counter-act the distortion that arises due to differences among the fields of view.

FIG. 10(c) schematically illustrates operation of a transform according to an embodiment of the present disclosure. In this embodiment, it may be assumed that padded image data from a top view 1020 is generated for placement adjacent to image data from a right view 1010. In this embodiment, a projection of image data from the top view 1020 is estimated as it appears in a plane of the right view 1030. For example, the object Obj (FIG. 10(a)) may be estimated to have a length 11 in the top view. This length occupies an angle α measured from a hypothetical center of the views of the cube map image. From the angle α, a length 12 of the object as it appears in a plane of the right view 1010 may be derived. Thus, padded image data 1030 may be developed (FIG. 10(d)) that counter-acts image distortion that may arise from different perspectives of the fields of view and provides improved continuity in image data for prediction purposes.

Figure 11:
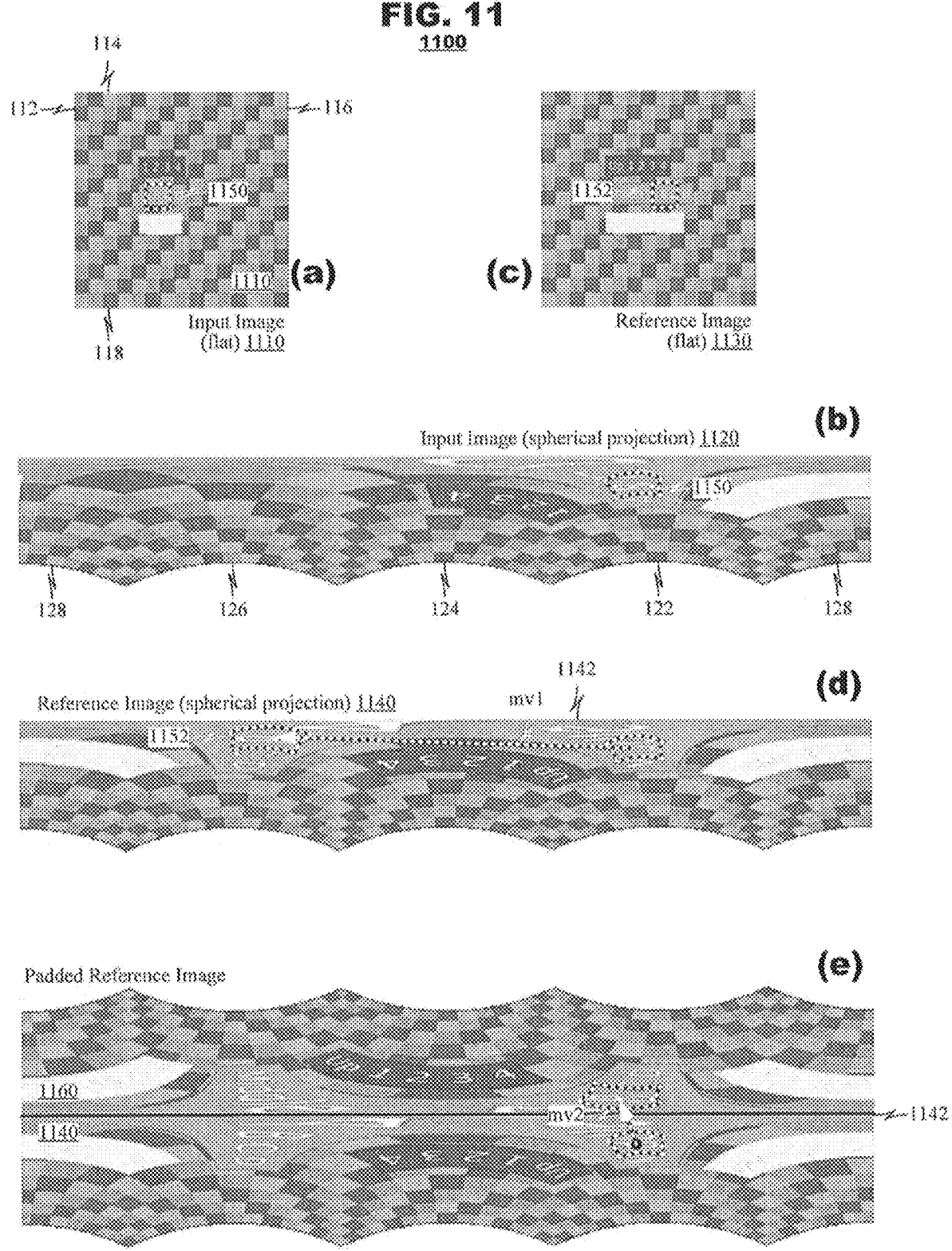
FIGS. 11(a)-(e) illustrate application of padding data used with spherically projected image data according to an embodiment of the present disclosure.

The principles of the present invention also find application with equirectangular images in spherical projection format. FIG. 11 illustrates an application of padding data used with spherically projected image data. FIG. 11(a) illustrates image data of a first view 1110 in a flat projection and FIG. 11(b) illustrates image data 1120 of the FIG. 11(a) view transformed according to a spherical projection. Such transforms are common, for example, when mapping data from a top view of an omnidirectional camera to an equirectangular image. Essentially, the view 1110 may represent data of a "north pole" of an image space.

FIGS. 11(c) and (d) represent an exemplary reference image according to a flat image format (reference number 1130) and a spherical projection (reference number 1140). During video coding, image data of the spherically projected reference image 1140 may serve as a prediction reference for a new image, represented by spherically projected image 1120. It may occur that, due to the spherical projection of image data, fairly modest changes of motion of data in the flat domain (for example, between pixel blocks 1150 and 1152) may induce large displacements in an equirectangular image, illustrated by motion vector mv in FIG. 11(d).

Image padding, shown in FIG. 11(e), can replicate prediction data along a periphery of the equirectangular image. In the example of FIG. 11(e), a padded reference image is created by duplicating the content of the reference image 1140 along its edge 1142 (FIG. 11(d)), flipping the duplicated image and placing it adjacent to the edge 1142. In this manner, the padded reference image creates continuity in image content along the edge 1142, which can create shorter motion vectors during prediction searches and thereby lead to improved efficiency in coding.

FIG. 12 illustrates a method 1200 according to an embodiment of the present disclosure. The method 1200 predicts a search window for a pixel block of an equirectangular image according to motion vectors of previously-coded pixel blocks from the same image. The method 1200 may project motion vectors of the previously-coded pixel blocks from a domain of the equirectangular image to a spherical domain (box 1210). The method 1200 may estimate a search window of a new pixel block to be coded from the spherically-projected motion vectors of the previously-coded pixel blocks (box 1220). The method 1200 may transform the search window from the spherical projection back to the equirectangular projection of the input image (box 1230). Thereafter, the method 1200 perform a prediction search for a reference within the transformed search window (box 1240).

FIG. 13 illustrates an exemplary equirectangular image 1300 that might be processed by the method 1200 of FIG. 12. At the time a pixel block 1310 is coded, other pixel blocks 1320, 1330 from the image 1300 may already be coded and, thus, motion vectors mv1, mv2 may be defined for the coded pixel blocks 1320, 1330 (FIG. 13(a)). These motion vectors mv1, mv2 may be projected to a spherical domain 1350 (FIG. 13(b)). In many instances, the motion vectors mv1, mv2 may refer to a co-located region of image content in a spherical projection (FIG. 13(b)) even though the motion vectors mv1, mv2 do not refer to co-located regions in an equirectangular format. A search window may be derived from the motion vectors in the spherical projection, for example, by averaging the motion vectors and defining a search region of predetermined size about the resultant vector obtained therefrom. Thereafter, the search window may be transformed back to the domain of the equirectangular image 1300.

Transforms between the equirectangular format to the spherical projection may be performed according to the techniques described in co-pending application Ser. No. 15/390,202, filed Dec. 23, 2016, the disclosure of which is incorporated herein.

Figure 14:
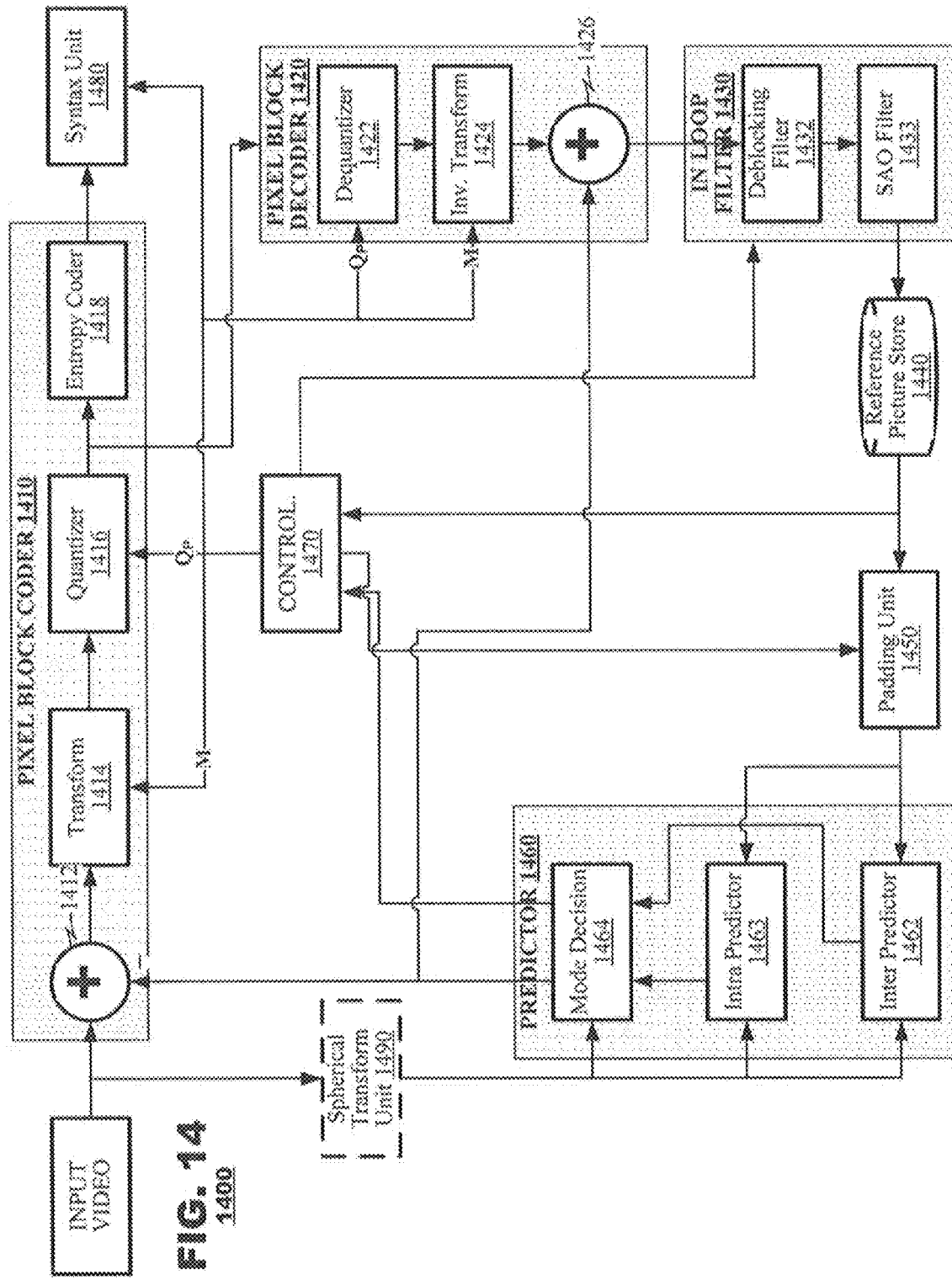
FIG. 14 is a functional block diagram of a coding system according to an embodiment of the present disclosure.

FIG. 14 is a functional block diagram of a coding system 1400 according to an embodiment of the present disclosure. The system 1400 may include a pixel block coder 1410, a pixel block decoder 1420, an in-loop filter system 1430, a reference picture store 1440, a padding unit 1450, a predictor 1460, a controller 1470, and a syntax unit 1480. The padding unit 1450 may generate padded image data according to one or more of the embodiments of the foregoing discussion. The pixel block coder and decoder 1410, 1420 and the predictor 1460 may operate iteratively on individual pixel blocks of a picture. The predictor equirectangular 1460 may predict data for use during coding of a newly-presented input pixel block. The pixel block coder 1410 may code the new pixel block by predictive coding techniques and present coded pixel block data to the syntax unit 1480. The pixel block decoder 1420 may decode the coded pixel block data, generating decoded pixel block data therefrom. The in-loop filter 1430 may perform various filtering operations on a decoded picture that is assembled from the decoded pixel blocks obtained by the pixel block decoder 1420. The filtered picture may be stored in the reference picture store 1440 where it may be used as a source of prediction of a later-received pixel block. The syntax unit 1480 may assemble a data stream from the coded pixel block data which conforms to a governing coding protocol.

The pixel block coder 1410 may include a subtractor 1412, a transform unit 1414, a quantizer 1416, and an entropy coder 1418. The pixel block coder 1410 may accept pixel blocks of input data at the subtractor 1412. The subtractor 1412 may receive predicted pixel blocks from the predictor 1460 and generate an array of pixel residuals therefrom representing a difference between the input pixel block and the predicted pixel block. The transform unit 1414 may apply a transform to the sample data output from the subtractor 1412, to convert data from the pixel domain to a domain of transform coefficients. The quantizer 1416 may perform quantization of transform coefficients output by the transform unit 1414. The quantizer 1416 may be a uniform or a non-uniform quantizer. The entropy coder 1418 may reduce bandwidth of the output of the coefficient quantizer by coding the output, for example, by variable length code words.

The transform unit 1414 may operate in a variety of transform modes as determined by the controller 1470. For example, the transform unit 1414 may apply a discrete cosine transform (DCT), a discrete sine transform (DST), a Walsh-Hadamard transform, a Haar transform, a Daubechies wavelet transform, or the like. In an embodiment, the controller 1470 may select a coding mode M to be applied by the transform unit 1415, may configure the transform unit 1415 accordingly and may signal the coding mode M in the coded video data, either expressly or impliedly.

The quantizer 1416 may operate according to a quantization parameter $Q_P$ that is supplied by the controller 1470. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The pixel block decoder 1420 may invert coding operations of the pixel block coder 1410. For example, the pixel block decoder 1420 may include a dequantizer 1422, an inverse transform unit 1424, and an adder 1426. The pixel block decoder 1420 may take its input data from an output of the quantizer 1416. Although permissible, the pixel block decoder 1420 need not perform entropy decoding of entropy-coded data since entropy coding is a lossless event. The dequantizer 1422 may invert operations of the quantizer 1416 of the pixel block coder 1410. The dequantizer 1422 may perform uniform or non-uniform de-quantization as specified by the decoded signal $Q_P$. Similarly, the inverse transform unit 1424 may invert operations of the transform unit 1414. The dequantizer 1422 and the inverse transform unit 1424 may use the same quantization parameters $Q_P$ and transform mode M as their counterparts in the pixel block coder 1410. Quantization operations likely will truncate data in various respects and, therefore, data recovered by the dequantizer 1422 likely will possess coding errors when compared to the data presented to the quantizer 1416 in the pixel block coder 1410.

The adder 1426 may invert operations performed by the subtractor 1412. It may receive the same prediction pixel block from the predictor 1460 that the subtractor 1412 used in generating residual signals. The adder 1426 may add the prediction pixel block to reconstructed residual values output by the inverse transform unit 1424 and may output reconstructed pixel block data.

The in-loop filter 1430 may perform various filtering operations on recovered pixel block data. For example, the in-loop filter 1430 may include a deblocking filter 1432 and a sample adaptive offset ("SAO") filter 1433. The deblocking filter 1432 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 1430 may operate according to parameters that are selected by the controller 1470.

The reference picture store 1440 may store filtered pixel data for use in later prediction of other pixel blocks. Different types of prediction data are made available to the predictor 1460 for different prediction modes. For example, for an input pixel block, intra prediction takes a prediction reference from decoded data of the same picture in which the input pixel block is located. Thus, the reference picture store 1440 may store decoded pixel block data of each picture as it is coded. For the same input pixel block, inter prediction may take a prediction reference from previously coded and decoded picture(s) that are designated as reference pictures. Thus, the reference picture store 1440 may store these decoded reference pictures.

The padding unit 1450 may generate padded image data as discussed in the foregoing embodiments. Thus, the padding unit may perform the operations illustrated in FIGS. 4-12 to generate padded image data from which the predictor 1460 may select prediction references.

As discussed, the predictor 1460 may supply prediction data to the pixel block coder 1410 for use in generating residuals. The predictor 1460 may include an inter predictor 1462, an intra predictor 1463 and a mode decision unit 1462. The inter predictor 1462 may receive spherically-projected pixel block data representing a new pixel block to be coded and may search spherical projections of reference picture data from store 1440 for pixel block data from reference picture(s) for use in coding the input pixel block. The inter predictor 1462 may support a plurality of prediction modes, such as P mode coding and B mode coding. The inter predictor 1462 may select an inter prediction mode and an identification of candidate prediction reference data that provides a closest match to the input pixel block being coded. The inter predictor 1462 may generate prediction reference metadata, such as motion vectors, to identify which portion(s) of which reference pictures were selected as source(s) of prediction for the input pixel block.

The intra predictor 1463 may support Intra (I) mode coding. The intra predictor 1463 may search from among spherically-projected pixel block data from the same picture as the pixel block being coded that provides a closest match to the spherically-projected input pixel block. The intra predictor 1463 also may generate prediction reference indicators to identify which portion of the picture was selected as a source of prediction for the input pixel block.

The mode decision unit 1462 may select a final coding mode to be applied to the input pixel block. Typically, as described above, the mode decision unit 1462 selects the prediction mode that will achieve the lowest distortion when video is decoded given a target bitrate. Exceptions may arise when coding modes are selected to satisfy other policies to which the coding system 1400 adheres, such as satisfying a particular channel behavior, or supporting random access or data refresh policies. When the mode decision selects the final coding mode, the mode decision unit 1462 may output a non-spherically-projected reference block from the store 1440 to the pixel block coder and decoder 1410, 1420 and may supply to the controller 1470 an identification of the selected prediction mode along with the prediction reference indicators corresponding to the selected mode.

The controller 1470 may control overall operation of the coding system 1400. The controller 1470 may select operational parameters for the pixel block coder 1410 and the predictor 1460 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 1480, which may include data representing those parameters in the data stream of coded video data output by the system 1400. The controller 1470 also may select between different modes of operation by which the system may generate padded reference images and may include metadata identifying the modes selected for each portion of coded data.

During operation, the controller 1470 may revise operational parameters of the quantizer 1416 and the transform unit 1415 at different granularities of image data, either on a per pixel block basis or on a larger granularity (for example, per picture, pet slice, per largest coding unit ("LCU") or another region). In an embodiment, the quantization parameters may be revised on a per-pixel basis within a coded picture.

Additionally, as discussed, the controller 1470 may control operation of the in-loop filter 1430 and the prediction unit 1460. Such control may include, for the prediction unit 1460, mode selection (lambda, modes to be tested, search windows, distortion strategies, etc.), and, for the in-loop filter 1430, selection of filter parameters, reordering parameters, weighted prediction, etc.

In an embodiment, the predictor 1460 may perform prediction searches using input pixel block data and reference pixel block data in a spherical projection. Operation of such prediction techniques are described in U.S. patent application Ser. No. 15/390,202, filed Dec. 23, 2016 and assigned to the assignee of the present application. In such an embodiment, the coder 1400 may include a spherical transform unit 1490 that transforms input pixel block data to a spherical domain prior to being input to the predictor 1460. The padding unit 1450 may transform reference picture data to the spherical domain (in addition to performing the transforms described hereinabove) prior to being input to the predictor 1460.

As discussed, a video coding system 1400 may provide metadata in coded video data identifying parameters of the padding techniques that are selected by a coding system 1400. An exemplary syntax is described below which might be used in connection with the H.265 ("HEVC") coding protocol:

A video parameter set syntax may be modified by adding a new field, shown below as "vps_projection_format_id," to the as video_parameter_set_rbsp as follows:

| | Descriptor |
|---|---|
| video_parameter_set_rbsp( ) { | |
| vps_video_parameter_set_id | u(4) |
| vps_base_layer_internal_flag | u(1) |
| vps_base_layer_available_flag | u(1) |
| vps_max_layers_minus1 | u(6) |
| vps_max_sub_layers_minus1 | u(3) |
| vps_temporal_id_nesting_flag | u(1) |
| vps_projection_format_id | u(2) |

In this instance, the vps_projection_format_id may be a two bit field that identifies a projection format applied by an encoder.

The projection format may be signaled in a sequence parameter set (seq_parameter_set_rbsp( )) as follows:

| | Descriptor |
|---|---|
| seq_paramter_set_rbsp( ) { | |
| sps_video_paramter_set_id | u(4) |
| sps_max_sub_layers_minus1 | u(3) |
| sps_temporal_id_nesting_flag | u(1) |
| profile_tier_level (1,sps_max_sub_layers_minus1) | |
| sps_seq_parameter_set_id | ue(v) |
| projection_format_id | u(2) |
| if(projection_format_id= =2) { | |
| cube_map_packing_id | u(2) |
| reference_padding_mode | u(1) |
| } | |
| chroma_format_idc | ue(v) |

By way of example, the projection-format-id might take the following values:

| projection_format_id | Format |
|---|---|
| 0 | 2D Conventional Video |
| 1 | Equirectangular |
| 2 | Cube Map |
| 3 | Reserved |

Additionally, the cube_map_packing_id may be signaled as follows:

| cube_map_packing_id | Format |
|---|---|
| 0 | 3x2 in Bottom, Right, Top, Front, Left, Back [see FIG. 9] |
| 1 | 4x3 Top, Empty, Empty, Empty Front, Right, Back Left Bottom, Empty, Empty, Empty [see FIG. 3] |
| 2 | Reserved |
| 3 | Reserved |

Of course, the number of codes may be expanded as necessary to accommodate other cube map formats.

Further, the reference_padding_mode field may be coded to identify different transforms applied by an encoder. For example, if reference_padding_mode were set to "0," it may indicate that no transform were used. If reference_padding_mode were set to "1," it may indicate that transforms were performed according to FIG. 14. Here again, the number of codes may be expanded as necessary to accommodate other transformations.

Figure 15:
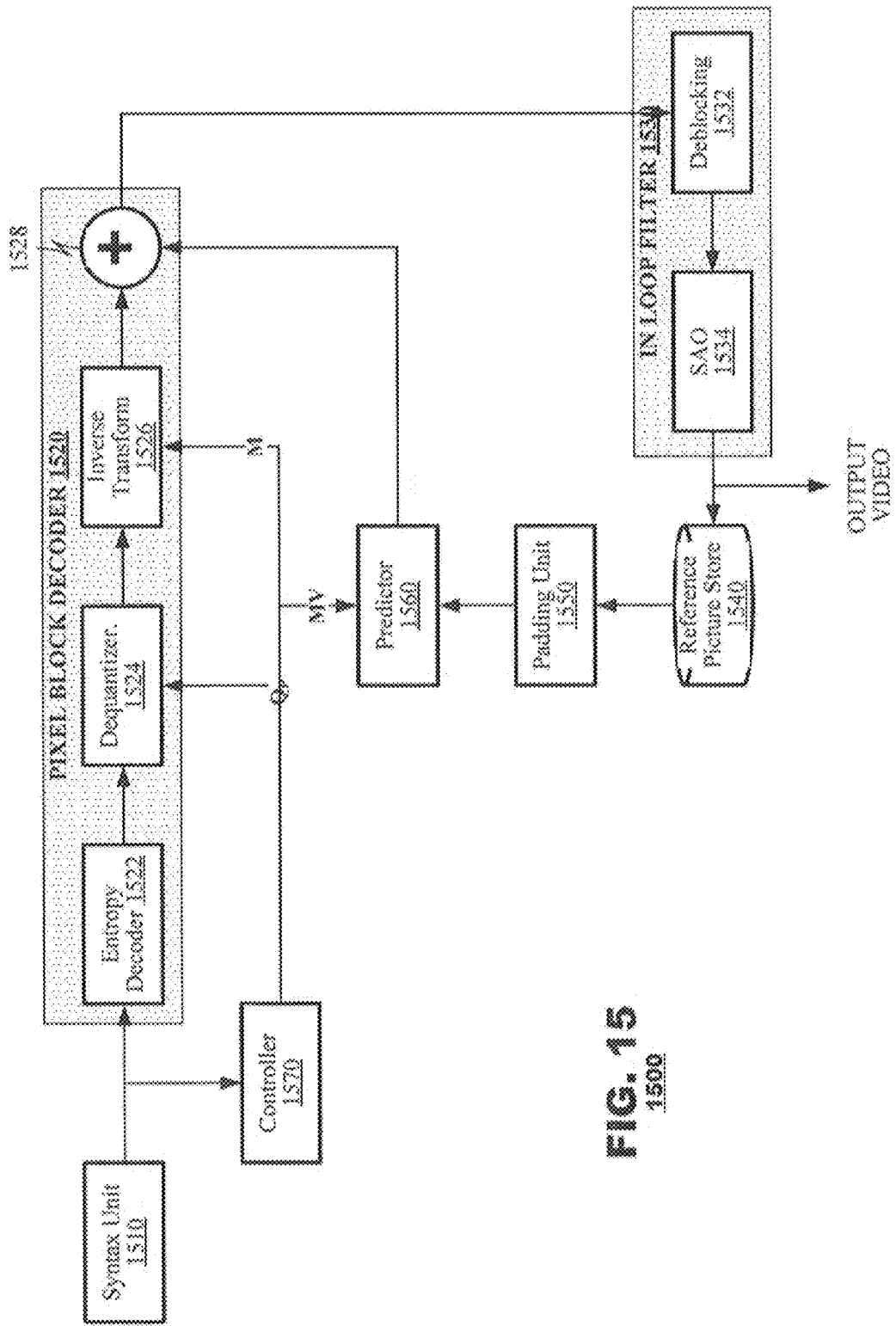
FIG. 15 is a functional block diagram of a decoding system according to an embodiment of the present disclosure.

FIG. 15 is a functional block diagram of a decoding system 1500 according to an embodiment of the present disclosure. The decoding system 1500 may include a syntax unit 1510, a pixel block decoder 1520, an in-loop filter 1530, a reference picture store 1140, a padding unit 1550, a predictor 1560, and a controller 1570. The syntax unit 1510 may receive a coded video data stream and may parse the coded data into its constituent parts. Data representing coding parameters may be furnished to the controller 1570 while data representing coded residuals (the data output by the pixel block coder 1110 of FIG. 11) may be furnished to the pixel block decoder 1520. The pixel block decoder 1520 may invert coding operations provided by the pixel block coder 1110 (FIG. 11). The in-loop filter 1530 may filter reconstructed pixel block data. The reconstructed pixel block data may be assembled into pictures for display and output from the decoding system 1500 as output video. The pictures also may be stored in the prediction buffer 1540 for use in prediction operations. The padding unit 1550 may generate padded reference images based on metadata contained in the coded data as described in the foregoing discussion. The predictor 1560 may supply prediction data to the pixel block decoder 1520 as determined by coding data received in the coded video data stream.

The pixel block decoder 1520 may include an entropy decoder 1522, a dequantizer 1524, an inverse transform unit 1526, and an adder 1528. The entropy decoder 1522 may perform entropy decoding to invert processes performed by the entropy coder 1118 (FIG. 11). The dequantizer 1524 may invert operations of the quantizer 1116 of the pixel block coder 1110 (FIG. 11). Similarly, the inverse transform unit 1526 may invert operations of the transform unit 1114 (FIG. 11). They may use the quantization parameters $Q_P$ and transform modes M that are provided in the coded video data stream. Because quantization is likely to truncate data, the data recovered by the dequantizer 1524, likely will possess coding errors when compared to the input data presented to its counterpart quantizer 1116 in the pixel block coder 1110 (FIG. 11).

The adder 1528 may invert operations performed by the subtractor 1111 (FIG. 11). It may receive a prediction pixel block from the predictor 1560 as determined by prediction references in the coded video data stream. The adder 1528 may add the prediction pixel block to reconstructed residual values output by the inverse transform unit 1526 and may output reconstructed pixel block data.

The in-loop filter 1530 may perform various filtering operations on reconstructed pixel block data. As illustrated, the in-loop filter 1530 may include a deblocking filter 1532 and an SAO filter 1534. The deblocking filter 1532 may filter data at seams between reconstructed pixel blocks to reduce discontinuities between the pixel blocks that arise due to coding. SAO filters 1534 may add offset to pixel values according to an SAO type, for example, based on edge direction/shape and/or pixel level. Other types of in-loop filters may also be used in a similar manner. Operation of the deblocking filter 1532 and the SAO filter 1534 ideally would mimic operation of their counterparts in the coding system 1100 (FIG. 11). Thus, in the absence of transmission errors or other abnormalities, the decoded picture obtained from the in-loop filter 1530 of the decoding system 1500 would be the same as the decoded picture obtained from the in-loop filter 1150 of the coding system 1100 (FIG. 11); in this manner, the coding system 1100 and the decoding system 1500 should store a common set of reference pictures in their respective reference picture stores 1140, 1540.

The reference picture stores 1540 may store filtered pixel data for use in later prediction of other pixel blocks. The reference picture stores 1540 may store decoded pixel block data of each picture as it is coded for use in intra prediction. The reference picture stores 1540 also may store decoded reference pictures.

The padding unit 1550 may generate padded reference images based on metadata contained in the coded data as described in the foregoing discussion. Thus, the padding unit 1550 also may perform operations as described in the foregoing FIGS. 4-11 to generate padded reference images on which the predictor 1560 may operate. In a decoder 1500, the type of padded image data will be determined by metadata provided in coded image data identifying padding operations that were performed by an encoder. The padding unit 1550 may replicate the padding operations to generate padded reference image data that matches the padded reference image data generated by an encoder.

Of course, the padding unit 1550 need not perform padding operations unless prediction information associated with a coded pixel block references data in a padded region of a padded reference image. Referring to FIG. 8, if an encoder codes pixel block PB1 using prediction data from a top view 872 of a padded reference image 870, then the pixel block PB1 does not rely on data from any of the padded images 874.1-874.4. At a decoder, the padding unit 1550 need not perform operations to derive padded image data to decode the coded pixel block PB1. On the other hand, a different pixel block (say, PB2) may be coded using data from a padded image 884.3 (FIG. 8(c)). In this instance, the padding unit 1550 (FIG. 15) may develop padded image data corresponding to the reference data selected by an encoder. Thus, the decoder 1500 determines whether padded image data is referenced by prediction before generating padded image data for a given coded pixel block.

As discussed, the predictor 1560 may supply the transformed reference block data to the pixel block decoder 1520. The predictor 1560 may supply predicted pixel block data as determined by the prediction reference indicators supplied in the coded video data stream. The predictor 1560 also may replicate the transform techniques described in FIGS. 12-13.

The controller 1570 may control overall operation of the coding system 1500. The controller 1570 may set operational parameters for the pixel block decoder 1520 and the predictor 1560 based on parameters received in the coded video data stream. As is relevant to the present discussion, these operational parameters may include quantization parameters $Q_P$ for the dequantizer 1524 and transform modes M for the inverse transform unit 1515. As discussed, the received parameters may be set at various granularities of image data, for example, on a per pixel block basis, a per picture basis, a per slice basis, a per LCU basis, or based on other types of regions defined for the input image.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Figure 16:
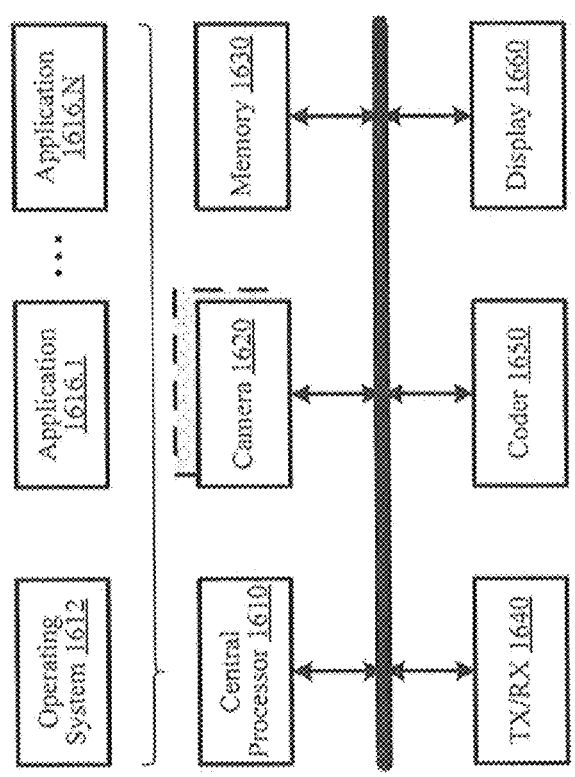
FIG. 16 illustrates an exemplary computer system suitable for use with embodiments of the present disclosure.

For example, the techniques described herein may be performed by a central processor of a computer system. FIG. 16 illustrates an exemplary computer system 1600 that may perform such techniques. The computer system 1600 may include a central processor 1610, one or more cameras 1620, a memory 1630, and a transceiver 1640 provided in communication with one another. The camera 1620 may perform image capture and may store captured image data in the memory 1630. Optionally, the device also may include sink components, such as a coder 1650 and a display 1660, as desired.

The central processor 1610 may read and execute various program instructions stored in the memory 1630 that define an operating system 1612 of the system 1600 and various applications 1616.1-1616.N. The program instructions may perform coding mode control according to the techniques described herein. As it executes those program instructions, the central processor 1610 may read, from the memory 1630, image data created either by the camera 1620 or the applications 1616.1-1616.N, which may be coded for transmission. The central processor 1610 may execute a program that operates according to the principles of FIG. 6. Alternatively, the system 1600 may have a dedicated coder 1650 provided as a standalone processing system and/or integrated circuit.

As indicated, the memory 1630 may store program instructions that, when executed, cause the processor to perform the techniques described hereinabove. The memory 1630 may store the program instructions on electrical-, magnetic- and/or optically-based storage media.

The transceiver 1640 may represent a communication system to transmit transmission units and receive acknowledgement messages from a network (not shown). In an embodiment where the central processor 1610 operates a software-based video coder, the transceiver 1640 may place data representing state of acknowledgment message in memory 1630 to retrieval by the processor 1610. In an embodiment where the system 1600 has a dedicated coder, the transceiver 1640 may exchange state information with the coder 1650.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. Unless described otherwise herein, any of the methods may be practiced in any combination.

We claim:

1. A video coding method, comprising:
for a reference image stored in a spherical projection format having a first view in the spherical projection at a first location within the reference image, generating a padded reference image in which image data of the first view in the spherical projection is placed at the first location within the padded reference image and image data of the first view in the spherical projection is reflected over an edge of the first location and placed at a second location within the padded reference image adjacent to the first location and sharing the edge,
for a pixel block of an input image to be coded, searching for a prediction match between the input image and content of the padded reference image, the search including the image data placed at the first location and the second location,
when a match occurs, coding the pixel block differentially with respect to matching data from the padded reference image.

2. The method of claim 1, wherein:
the reference image contains data of a plurality of views and at least one null region that does not contain image content, and
the padded reference image contains data of the plurality of views, and at least one of the first location and the second location corresponds to a location of a null region in the reference image.

3. The method of claim 1, wherein: the reference image contains data of a plurality of views, and
the padded reference image contains data of a view of the reference image that spatially corresponds to the pixel block to be coded, and
the image data placed at the second location is data of another view from the reference image that shares an edge with the view of the reference image that spatially corresponds to the pixel block to be coded.

4. The method of claim 1, wherein the generating comprises projecting image data of the first view onto a plane of a second view of the reference image, the second view corresponding to a spatial location of the pixel block to be coded.

5. The method of claim 1, wherein the generating orients image data of the first view with respect to the second view to provide continuity of image data across a seam between the views.

6. The method of claim 1, wherein the reference image is a cube map image having a plurality of views wherein image continuity is preserved across all internal edges of the cube map image.

7. The method of claim 1, wherein the reference image is a cube map image having a plurality of views wherein image continuity is preserved across a plurality of internal edges of the cube map image but image continuity is not preserved across other internal edges of the cube map image.

8. The method of claim 1, wherein the input image is generated by an omnidirectional camera.

9. The method of claim 1, wherein the input image is generated by a computer application.

10. The method of claim 1, wherein:
the image data of the first view placed at the second location within the padded reference image is rotated with respect to the image data of the first view placed at the first location within the padded reference image to preserve continuity of image data across a first seam between views at the first location and across a second seam between views at the second location.

11. A video coding system, comprising:
a video coder having an input for a pixel block to be coded and a predicted pixel block;
a video decoder having an input coupled to an output of the video coder;
a reference picture store to store decoded pictures generated by the video decoder, the decoded pictures in a spherical projection format;
a padding unit including a processor that when executing instructions cause the padding unit to generate a padded reference image from a decoded picture, the decoded picture including a first view in the spherical projection stored in the reference picture store, the padded reference image having image data of the first view of the decoded picture that is placed at a first location in a spherical projection and is reflected over an edge of the first location and placed at a second location in the spherical projection within the padded reference image, wherein the second location is adjacent to the first location and shares the edge; and a predictor having an input coupled to the padding unit and an output coupled to the video coder, wherein the predictor is configured to, for the pixel block to be coded, searching for a prediction match between the pixel block to be coded and content of the padded reference image, the search including the image data placed at the first location and the second location, and wherein the video coder codes the pixel block differentially with respect to matching data from the padded reference image.

12. The system of claim 11, wherein:

the decoded pictures contain data of a plurality of views and at least one null region that does not contain image content, and the padded reference image contains data of the plurality of views, and at least one of the first location and the second location corresponds to a location of a null region in the reference image.

13. The system of claim 11, wherein: the decoded pictures contain data of a plurality of views, and the padded reference image contains:

data of a view of the reference image that spatially corresponds to the pixel block to be coded, and the image data placed at the second location is data of another view from the decoded picture contain data that shares an edge with the view of the reference image that spatially corresponds to the pixel block to be coded.

14. The system of claim 11, wherein the padding unit projects image data of the first view onto a plane of a second view of the decoded picture, the second view corresponding to a spatial location of the pixel block to be coded.

15. The system of claim 11, wherein the padding unit orients image data of the first view with respect to the second view to provide continuity of image data across a seam between the views.

16. The system of claim 11, wherein the cube map format has a plurality of views wherein image continuity is preserved across all internal edges of the cube map format.

17. The system of claim 11, wherein the cube map format has a plurality of views wherein image continuity is preserved across a plurality of internal edges of the cube map format but image continuity is not preserved across other internal edges of the cube map format.

18. The system of claim 11, further comprising an omnidirectional camera supplying image data from which input pixel blocks are derived.

19. The system of claim 11, further comprising a computer application that generates image data from which input pixel blocks are derived.

20. A non-transitory computer readable medium storing program instructions that, when executed by a processing device, cause the device to:

for a reference image stored in a spherical projection format having a first view in the spherical projection at a first location within the reference image, generate a padded reference image in which image data of the first view in the spherical projection is placed at the first location within the padded reference image and image data of the first view in the spherical projection is reflected over an edge of the first location and placed at a second location within the padded reference image adjacent to the first location and sharing the edge, for a pixel block of an input image to be coded, search for a prediction match between the input image and content of the padded reference image, the search including the image data placed at the first location and the second location, when a match occurs, code the pixel block differentially with respect to matching data from the padded reference image.

21. The medium of claim 20, wherein:

the reference image contains data of a plurality of views and at least one null region that does not contain image content, and the padded reference image contains data of the plurality of views, and at least one of the first location and the second location corresponds to a location of a null region in the reference image.

22. The medium of claim 20, wherein: the reference image contains data of a plurality of views, and the padded reference image contains:

data of a view of the reference image that spatially corresponds to the pixel block to be coded, and the image data placed at the second location is data of another view from the reference image that shares an edge with the view of the reference image that spatially corresponds to the pixel block to be coded.

23. The medium of claim 20, wherein the device projects image data of the first view onto a plane of a second view of the reference image, the second view corresponding to a spatial location of the pixel block to be coded.

24. A video decoding method, comprising:

for a coded pixel block, determining from prediction data of the coded pixel block whether the coded pixel block is coded with reference to padded reference image data in a spherical projection format, when the coded pixel block is coded with reference to padded reference image data, generating padded reference image from a stored reference image by placing image data of a first view of the reference image in the spherical projection at a first location and a second location adjacent to the first location within the padded reference image, wherein the image data at the second location is reflected from the image data at the first location across an edge shared between the first location and the second location, decoding the coded pixel block using the padded reference image data as a prediction reference for the coded pixel block.

25. A video decoder, comprising:

a video decoder having an input for coded pixel block data;

a reference picture store to store decoded pictures generated by the video decoder, the decoded pictures in spherical projection format;

a padding unit, to generate a padded reference image from a decoded picture stored in the reference picture store, the padded reference image having image data of a first view of the decoded picture in the spherical projection that is placed at a first location and a second location adjacent to the first location within the padded reference image, wherein the image data at the second location is reflected from the image data at the first location across an edge shared between the first location and the second location; and a predictor having an input coupled to the padding unit and an output coupled to the video decoder.

26. A video coding method, comprising:

for a reference image represented according to a spherical projection, generating a padded reference image in which image data of a portion of the reference image in the spherical projection is placed at a first location and a second location within the padded reference image, wherein the second location is adjacent to an edge of the reference image, for a pixel block of an input image to be coded, searching for a prediction match between the input image and content of the padded reference image, the search including the image data placed at the second location, when a match occurs, coding the pixel block differentially with respect to matching data from the padded reference image.

* * * * *